US005615318A

United States Patent [19]

Matsuura

[11] Patent Number: 5,615,318
[45] Date of Patent: Mar. 25, 1997

[54] METHOD AND APPARATUS FOR VISUALIZING ASSEMBLED SEWING PATTERNS

[75] Inventor: Susumu Matsuura, Tokyo, Japan

[73] Assignee: Asahi Kasei Kogyo Kabushiki Kaisha, Osaka, Japan

[21] Appl. No.: 7,284

[22] Filed: Jan. 21, 1993

[30] Foreign Application Priority Data

Jan. 23, 1992 [JP] Japan .................................. 4-010171
Jan. 23, 1992 [JP] Japan .................................. 4-010172

[51] Int. Cl.$^6$ ................................................ G06T 17/40
[52] U.S. Cl. ........................... 395/120; 395/125; 395/127; 395/141
[58] Field of Search ........................... 395/118, 119, 395/125, 103, 120, 121, 122, 123, 130, 135, 127, 141, 142; 382/41, 276, 285, 286

[56] References Cited

U.S. PATENT DOCUMENTS

| | | | |
|---|---|---|---|
| 3,621,214 | 11/1971 | Romney et al. | 395/121 |
| 4,539,585 | 9/1985 | Spackova et al. | 382/41 |
| 4,734,690 | 3/1988 | Waller | 395/127 |
| 4,737,921 | 4/1988 | Goldwasser et al. | 395/135 |
| 4,775,946 | 10/1988 | Anjyo | 395/119 |
| 4,785,399 | 11/1988 | Evans et al. | 395/142 |
| 4,888,713 | 12/1989 | Falk . | |
| 4,949,286 | 8/1990 | Ohba | 395/125 |
| 5,010,502 | 4/1991 | Diebel et al. | 395/119 |
| 5,107,444 | 4/1992 | Wu | 395/125 |
| 5,163,006 | 11/1992 | Deziel | 395/135 |
| 5,255,352 | 10/1993 | Falk | 395/125 |

FOREIGN PATENT DOCUMENTS

| | | |
|---|---|---|
| 33746B | 5/1985 | Austria . |
| 0205683 | 12/1986 | European Pat. Off. . |
| 2024213 | 12/1970 | Germany . |
| 2656997 | 7/1977 | Germany . |
| 62-126468 | 6/1987 | Japan . |
| 62-182829 | 8/1987 | Japan . |
| 62-259173 | 11/1987 | Japan . |
| 63-303106 | 12/1988 | Japan . |
| 4-167185 | 7/1992 | Japan . |

OTHER PUBLICATIONS

Agui et al.; Three–Dimensional Reconstruction of Torsos by Computer and Its Application; 1986; pp. 95–105.
Woods, G. P.; Computer Aided Pattern Generation for the Garment Industry; 1989; pp. 11–17, 27–36, 90–93, 107–128, 168–201, 251–262, 266–271.
Heisey et al.; Three–Dimensional Pattern Drafting Part II: Garment Modeling; 1990; pp. 731–737.
Hinds et al.; Pattern Development for 3D Surfaces; 1991; pp. 583–592.
Fetter, William A.; *A Progression of Human Figures Simulated by Computer Graphics;* 1982; pp. 9–13.
Weil, Jerry; *The Synthesis of Cloth Objects;* 1986; pp. 49–54.
Hinds et al.; *Interactive Garment Design;* 1990; pp. 53–61.
Chen et al., *A Study in Interactive 3–D Rotation Using 2–D Control Devices;* 1988; pp. 121–129.
Foley et al.; *Computer Graphics: Principles and Practice;* Second Edition; 1992; pp. 376–381.
The Transactions of the Institute of Electronics and Communications Engineers of Japan, vol., J69–D, No. 3, Mar. 1986, pp. 451–459.
Communication from German Patent Office dated Jul. 12, 1994 (German and English Translations).

*Primary Examiner*—Mark K. Zimmerman
*Attorney, Agent, or Firm*—Finnegan, Henderson, Farabow, Garrett & Dunner, L.L.P.

[57] ABSTRACT

Waist and chest lengths of sewing patterns in an assembled state are handled as shape features of the sewing pattern. The shape of a reference dummy (dress form) is expanded and changed in form so that the waist and chest lengths of the reference dummy after expansion agree with the waist and chest lengths of the shape formed by assembling the sewing patterns. Calculation of the expansion processing is conducted by a central processing unit (CPU). The shape data of the reference dummy associated with the calculation is read from a floppy disk (FD) by means of an floppy disk drive (FDD).

10 Claims, 44 Drawing Sheets

METHOD AND APPARATUS FOR VISUALIZING ASSEMBLED SEWING PATTERNS

BACKGROUND OF THE INVENTION

1. Field of the Invention

The present invention relates to an apparatus and method for visualizing the shape formed by assembling sewing patterns, and more particularly to a three-dimensional image display method suitable for the apparatus for visualizing the shape formed by assembling sewing patterns.

2. Description of the Prior Art

Heretofore, computer-aided techniques in the production process in the apparel industry have been used in grading and marking, and gradually been applied to pattern making. In particular, a CAD (Computer Aided Design) system is used in the pattern making as follows:

(a) Original sewing patterns and silhouette patterns are registered in a data base so that a sewing pattern which conforms to a predetermined condition is searched.

(b) The sewing pattern image prepared by the above searching is subjected to various image processing steps.

The image processing steps include point creation, point movement, line drawing on the sewing pattern, and rotation and division of the sewing pattern and the like.

Although using such image processing techniques makes it possible to easily perform two-dimensional preparation and modification of sewing patterns, wearing comfortableness, design balance, size adaptability and the like cannot be evaluated until clothes are actually fabricated. Therefore, there have been increasing requirements from users to confirm a shape formed by assembling a plurality of sewing patterns on a CAD display screen.

To present the shape of assembled sewing patterns, there has been proposed a method in which horizontal cross sections of assembled sewing patterns are approximated by using ellipses and straight lines to generate three-dimensional shape data from the two-dimensional shape data of the sewing patterns (The Transactions of the Institute of Electronics and Communications Engineers of Japan, Vol. J69-D, No. 3, pp. 451–459, March, 1986).

Since the proposition teaches the way to represent a three-dimensional shape of assembled sewing patterns, it has become possible to visually display two-dimensional projection images of the assembled shape provided the three-dimensional shape data is obtained.

In general, when a three-dimensional object of the shape specified by such three-dimensional shape data is displayed, a two-dimensional projection image such as a perspective image of the object observed from a certain viewpoint is displayed. For this purpose, a user inputs three-dimensional coordinates in the form of numeral values.

The above proposition, however, approximates the circumferences of the horizontal cross sections of the assembled sewing patterns by four quarter-ellipses and two straight lines. This presents a problem in that a three-dimensional shape represented by the three-dimensional shape data takes somewhat squarish form different from the outer shape of an actual wearer or a dress form, thus presenting shapes different from those formed by actually wearing clothes.

Furthermore, a user is required to determine relative positional relationships between the viewpoint and the object by drawing or the like. The entire shape of the displayed perspective image cannot be perceived if the inputted viewpoint is too high or too low. Therefore, the user must input viewpoint coordinates several times on the trial and error basis, and display the perspective image on the display screen every time in order to obtain a good perspective image.

SUMMARY OF THE INVENTION

Therefore, it is a primary object of the present invention to provide an apparatus and method for visualizing the shape formed by assembling sewing patterns, which allows the user to learn an estimated shape of assembled sewing patterns approximate to the wearing condition of the clothes, thus eliminating the prior art problems described above.

Another object of the present invention is to provide an apparatus for visualizing the shape formed by assembling sewing patterns, and a method for instructing the position of a viewpoint, which can facilitate the input operation of information on the viewpoint in displaying a three-dimensional image.

According to a first aspect of the present invention, there is provided a shape visualization method comprising the steps of:

inputting to a calculation unit three-dimensional coordinate values indicating a shape of a dress form and main dimensions of a shape formed by assembling sewing patterns on the dress form;

generating by the calculation unit three-dimensional coordinate values indicating the shape formed by assembling the sewing patterns according to the inputted three-dimensional coordinate values and the main dimensions;

generating by an image processing unit a two-dimensional projection image from the calculated three-dimensional coordinate values; and displaying the generated two-dimensional projection image as a two-dimensional projection image of the shape formed by assembling the sewing patterns on a display screen of a display unit.

According to a second aspect of the present invention, there is provided a shape visualization apparatus comprising;

input means for inputting three-dimensional coordinate values indicating a shape of a dress form and main dimensions of a shape formed by assembling sewing patterns on the dress form;

calculation means for generating three-dimensional coordinate values indicating the shape formed by assembling the sewing patterns according to the inputted three-dimensional coordinate values and the main dimensions;

image processing means for generating a two-dimensional projection image from the calculated three-dimensional coordinate values; and display means for displaying the generated two-dimensional projection image as a two-dimensional projection image of the shape formed by assembling the sewing patterns on a display screen of the display means.

According to a third aspect of the present invention, there is provided a shape visualization method comprising the steps of:

determining in advance a correlation between a first coordinate position indicating the position of a viewpoint in a three-dimensional space and a second coordinate position indicating the position of the viewpoint in a two-dimensional space, the viewpoint and the first coordinate position being used for generating a three-dimensional display image, and the second coordinate position being used for inputting instruction;

setting the two-dimensional space on the display screen, and displaying the two-dimensional space and the viewpoint on the two-dimensional space in specific figures on the display screen of the display means;

inputting the second coordinate position of the viewpoint from a coordinate input unit;

moving the specific figure indicating the viewpoint to a position, which corresponds to the second coordinate position, on the display screen of the display means each time the second coordinate position of the viewpoint is inputted from the coordinate input unit; and converting the second coordinate position inputted from the coordinate input unit into the first coordinate position of the viewpoint according to the correlation.

According to a fourth aspect of the present invention, there is provided a shape visualization apparatus comprising:

display means for setting a two-dimensional space on a display screen, and displaying the two-dimensional space and a viewpoint on the two-dimensional space in specific figures on a display screen of the display means;

coordinate input means for inputting a second coordinate position indicating a position of the viewpoint on the two-dimensional space;

display controlling means for moving a specific figure indicating the viewpoint to a position, which corresponds to the second coordinate position, on the display screen of the display means each time the second coordinate position of the viewpoint is inputted from the coordinate input unit; and calculation processing means for determining in advance a correlation between a first coordinate position indicating the position of a viewpoint in a three-dimensional space and the second coordinate position indicating the position of the viewpoint in the two-dimensional space, the viewpoint and the first coordinate position being used for generating a three-dimensional display image, and the second coordinate position being used for inputting instruction, and for converting the second coordinate position inputted from the coordinate input means into the first coordinate position of the viewpoint according to the correlation.

The present invention directs its attention to the fact that, although the forms of horizontal cross sections of the assembled shape of sewing patterns are freely changed by an external force, the entire circumferential length of each horizontal cross section is maintained constant. Using this fact, the present invention estimates the three-dimensional shape formed by assembling sewing patterns by expanding and changing the shapes of a plurality of horizontal cross sections (including partial cross sections) of a dress form until the entire circumferential length of the bust of the dress form, for example, agrees with a major size (the entire length of the bust, in this case) after the expansion.

According to the first and second aspects of the present invention, three-dimensional coordinate values determining the shape of a dress form are inputted. In addition, entire circumferential lengths of particular horizontal cross sections are inputted as major sizes representing the dimensions of the three-dimensional shape formed by assembling sewing patterns. The three-dimensional coordinate values specifying the shape formed by assembling sewing patterns are calculated by the calculation unit according to the inputted values. From these three-dimensional coordinate values, a two-dimensional projection image for display is generated and displayed.

According to the third and fourth aspects of the present invention, taking account of the fact that a first position on a three-dimensional space and a second position on a two-dimensional space obtained by projecting or mapping the three-dimensional space on the two-dimensional space have one to one correspondence, the viewpoint on the three-dimensional is informed to the operator by displaying the two-dimensional space and the viewpoint in a figurative fashion on the display screen of the display means. In addition, amounts of displacement of the coordinate positions on the three-dimensional space, that is, correction amounts are informed to the operator by displaying the movement of a particular figure showing the viewpoint in accordance with the coordinate positions inputted from the coordinate input means. Moreover, a (first) coordinate position used in the generating a three-dimensional display image is produced by converting a second coordinate position, which is inputted from the coordinate input means, to the first coordinate position.

According to the present invention, since the shape formed by assembling sewing patterns is estimated by enlarging and changing the shape of the dress form, a shape approximate to the actual wearing condition of garment are obtained considering margins between the garment and the outer surface of the dress form. In addition, the margins and design balance in the wearing state can be learned in detail by displaying the two-dimensional projection image of the dress form from the same viewpoint.

Furthermore, the efficiency in designing apparel is improved because matching between the design and the positions of design lines and the patterns of cloth can be confirmed.

Moreover, since the viewpoint on the display screen is represented on the two-dimensional space, the amount of displacement of the viewpoint to be corrected and the position after displacement can be readily learned, thereby reducing the number of trial and error until obtaining a desired viewpoint.

The above and other objects, effects, features and advantages of the present invention will become more apparent from the following description of embodiments thereof taken in conjunction with the accompanying drawings.

DETAILED DESCRIPTION OF A PREFERRED EMBODIMENT OF THE INVENTION

A preferred embodiment of the present invention will now be described in detail with reference to the drawings.

Figure 1:
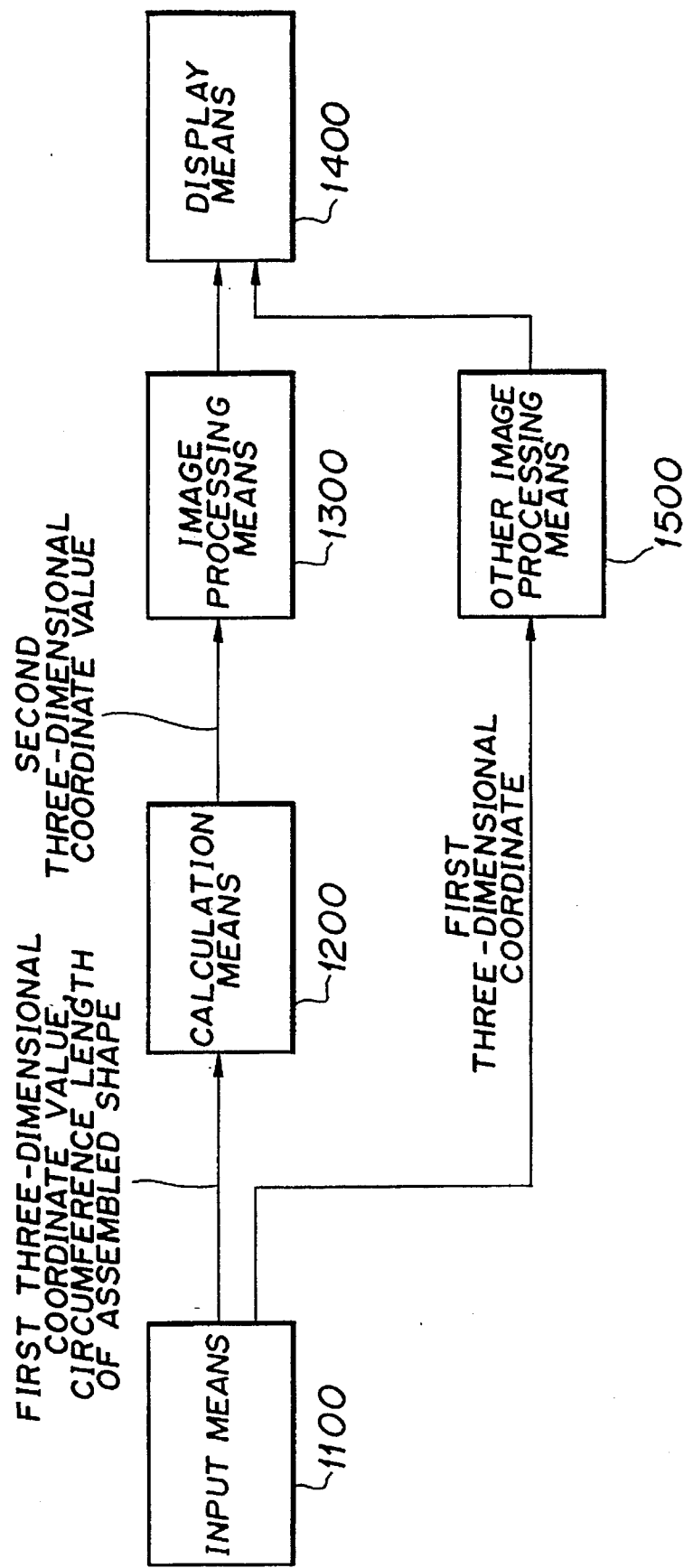
FIG. 1 is a block diagram showing a basic arrangement of an embodiment of an apparatus for visualizing the shape formed by assembling sewing patterns according to the present invention.

FIG. 1 shows a basic arrangement of the embodiment.

In FIG. 1, reference numeral 1100 designates input means for inputting (first) three-dimensional coordinate values of circumference of each horizontal cross section of a dress form at a plurality of heights, and lengths of sewing patterns (major dimensions), that are obtained when the sewing patterns are assembled on the dress form corresponding to the circumference of each horizontal cross section.

Reference numeral 1200 designates calculation means for calculating, on the basis of the inputted data, that is, the first three-dimensional coordinate values and the lengths of the sewing patterns, (second) three-dimensional coordinate values which correspond to the inputted data and represent the shape formed by assembling the sewing patterns. The calculated second three-dimensional coordinate values are considered to specify the form of each horizontal cross section of the second shape formed by assembling the sewing patterns for cutting, and the second three-dimensional coordinate values are formed by changing the three-dimensional coordinate values to obtain the form of the circumference of each horizontal cross section.

Reference numeral 1300 designates an image processing means for generating, from the calculated (second) three-dimensional coordinate values, a two-dimensional projection image associated with the shape formed by assembling the sewing patterns.

Reference numeral 1400 designates a display means for displaying the thus generated two-dimensional projection image.

Reference numeral 1500 designates another image processing means for generating, from the first three-dimensional coordinate values, a two-dimensional projection image of the dress form viewed from the same viewpoint as the that from which the two-dimensional projection image of the shape formed by assembling the sewing patterns is viewed.

Figure 2:
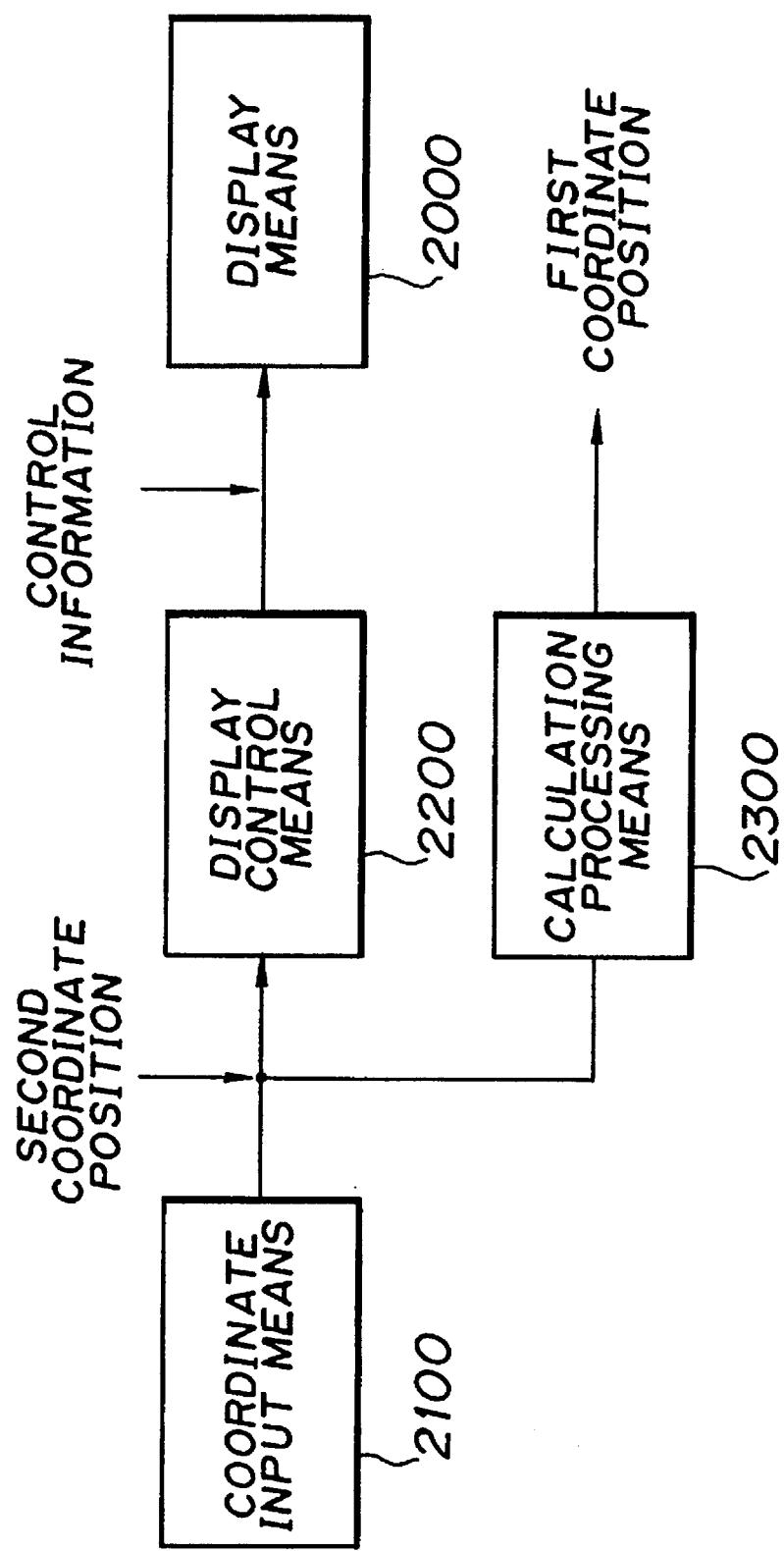
FIG. 2 is a block diagram showing another basic arrangement of the embodiment of an apparatus for visualizing the shape formed by assembling sewing patterns according to the present invention.

FIG. 2 is a block diagram showing a coordinate indication unit for determining and modifying three-dimensional coordinate values in generating a two-dimensional projection image.

In FIG. 2, the correlation between the first coordinate position and the second coordinate position is determined in advance with regard to the viewpoint for generating the three-dimensional display image. Here, the first coordinate position is used for generating the three-dimensional display image and indicates the position of the viewpoint on the three-dimensional space, and the second coordinate position is used for inputting indication and indicates the position of the viewpoint on the two-dimensional space.

Reference numeral 2000 designates a display means wherein a two-dimensional space is set on the display screen so that the two-dimensional space and the viewpoint on the two-dimensional space are each displayed in the form of specific figures.

Reference numeral 2100 denotes a coordinate input means for inputting a second coordinate position indicating the position of the viewpoint on the two-dimensional space.

Reference numeral 2200 designates a display control means for moving the specific figure representing the viewpoint to the position on the display screen of the display means corresponding to the second coordinate position every time the second coordinate position is inputted from the coordinate input means.

Reference numeral 2300 denotes a calculation processing means for converting the second coordinate position inputted from the coordinate input means to the first coordinate position according to the above-mentioned correlation.

Figure 3:
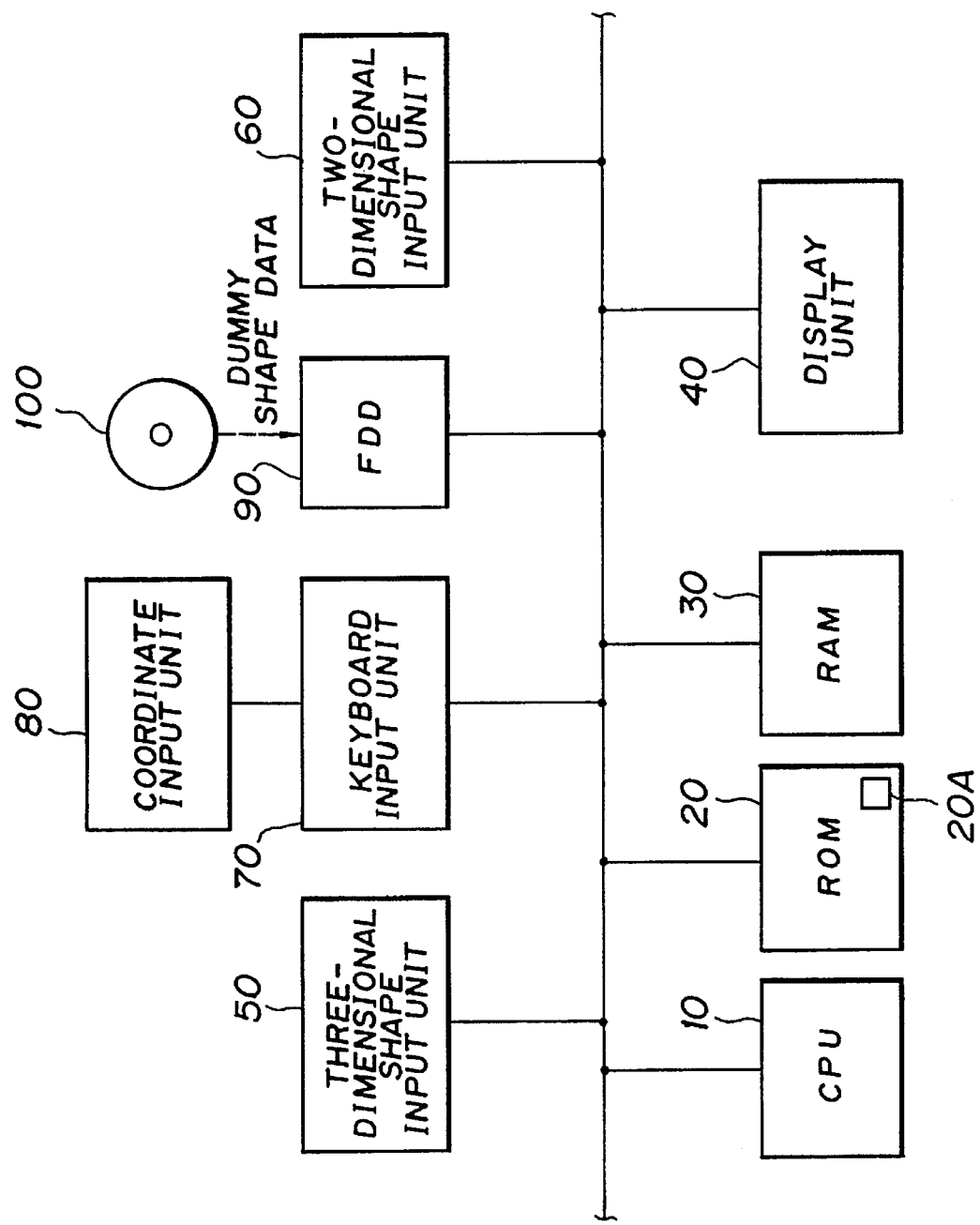
FIG. 3 is a block diagram showing an arrangement of the embodiment according to the present invention.

A more detailed arrangement of the embodiment of the present invention is shown in FIG. 3.

In FIG. 3, the following blocks are connected to a common bus.

Central processing unit (CPU) 10:

The CPU 10 performs operation control of the entire apparatus, and generates a three-dimensional image of the shape formed by assembling sewing patterns associated with the present invention according to various programs stored in a read only memory (ROM) 20. As will be described later, the CPU 10 operates as the display control means and the calculation processing means of the present invention.

Figure 5:
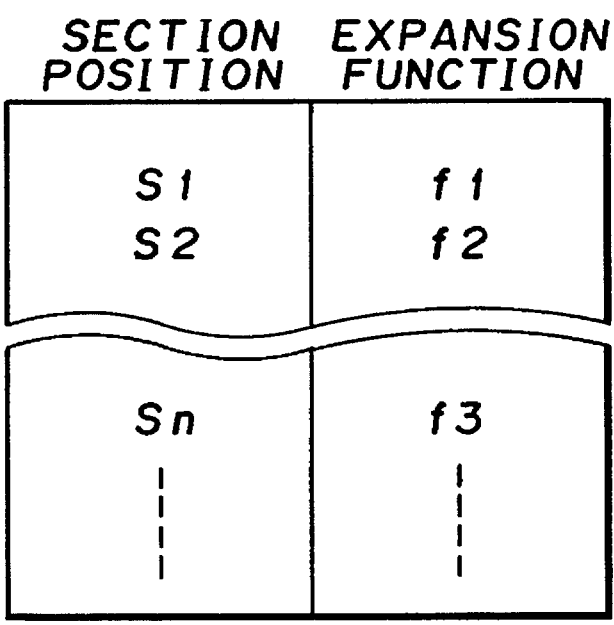
FIG. 5 is a schematic diagram showing the structure of table 20A in FIG. 3.

ROM 20:

The ROM 20 stores programs specifying calculation processing to be executed by the CPU 10. It also stores data used for generating a three-dimensional image of the sewing patterns. For example, it stores a table 20A (see, FIG. 5) containing expansion functions used for the expansion calculation of each cross section of the dress form used as a reference dummy. In addition, the ROM 20 also stores the specific figure used for inputting the coordinate of the viewpoint.

Figure 4:
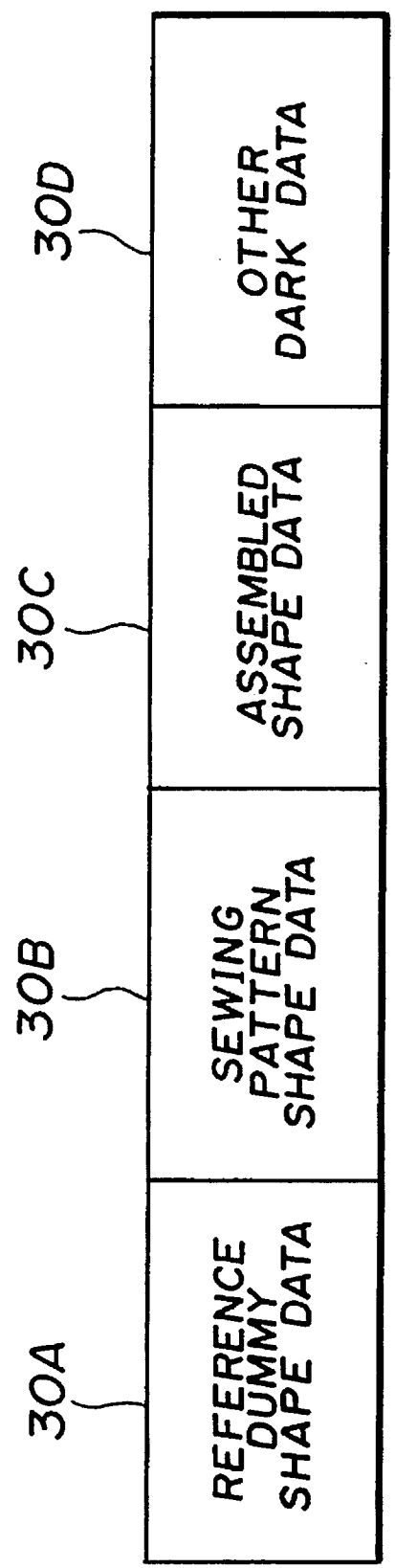
FIG. 4 is a schematic diagram showing storage areas of a RAM 30 in FIG. 3.

Random access memory (RAM) 30:

The RAM temporarily stores the input/output data to the CPU 10. The data associated with the generation of three-dimensional images of sewing patterns includes shape data of the reference dummy, shape data of the sewing patterns, estimated shape data of the assembled sewing patterns and other data. These data are stored in respective dedicated areas provided in the RAM 30 according to the data type as shown in FIG. 4.

Display unit 40:

As the display unit 40, a display unit is used which is capable of displaying dot patterns in color, such as a cathode ray tube display unit. The display unit 40 operates as the display means of the present invention.

Three-dimensional shape input unit 50:

The three-dimensional shape input unit 50 is provided for inputting the shape of an object in the form of three-dimensional coordinate values of respective positions on the outer surface of the object. This embodiment employs a three-dimensional shape input unit using a camera. The shape data of the reference dummy is inputted through the three-dimensional shape input unit 50. Two-dimensional shape input unit 60:

The two-dimensional shape input unit 60 is provided for inputting the plane shape of an object in the form of two-dimensional coordinate values of respective positions of the contours and internal lines of the plane. This embodiment employs a two-dimensional shape input unit using a solid state imaging device like a CCD line sensor. The flat shape of each sewing pattern is inputted through the two-dimensional shape input unit 60:

Keyboard input unit 70:

The keyboard input unit 70 is provided for inputting operation instructions to the CPU 10, and various numerical data used for calculation of the CPU 10. The keyboard input unit 70 is connected with a coordinate input unit 80 called a mouse. The coordinate input unit (coordinate input means of the present invention) 80 instructs the movement of the cursor on the display screen of the display unit 40 so that the coordinate data is inputted by the cursor position.

Floppy disk storage unit (FDD) 90:

The floppy disk storage unit 90 performs read/write of information on a floppy disk (FD) 100. The FD 100 stores shape data of the reference dummy classified by sex and body style in the form of a data base. Furthermore, the reference dummy shape data which is newly inputted from the three-dimensional shape input unit 50 is registered on the FD 100 by the FDD 90 according to the instruction of the CPU 10.

To generate a three-dimensional image of the shape formed by assembling the sewing patterns, the reference dummy shape data instructed from the CPU 10 is read from the FD 100 by using the FDD 90. The FDD 90 constitutes a part of the input means of the present invention.

The reference dummy shape data will be described with reference to FIGS. 6–8.

Figure 6:
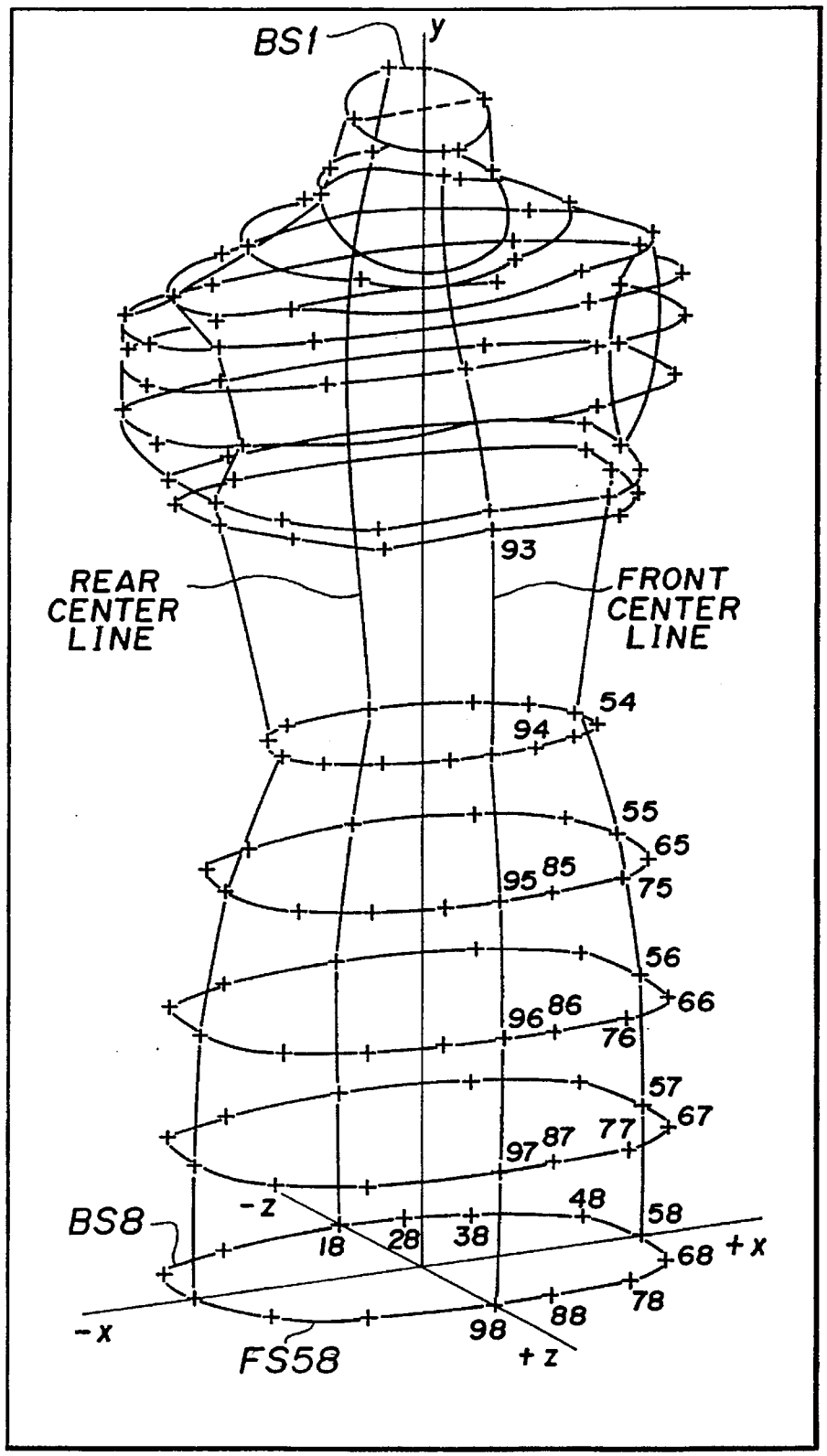
FIG. 6 is a schematic perspective diagram showing characteristic point positions of a dress form in the embodiment according to the present invention.

In FIG. 6, positions designated by a + mark indicate the positions of characteristic points on the outer surface of the reference dummy. These positions are provided with identification numbers in advance.

Figure 7:
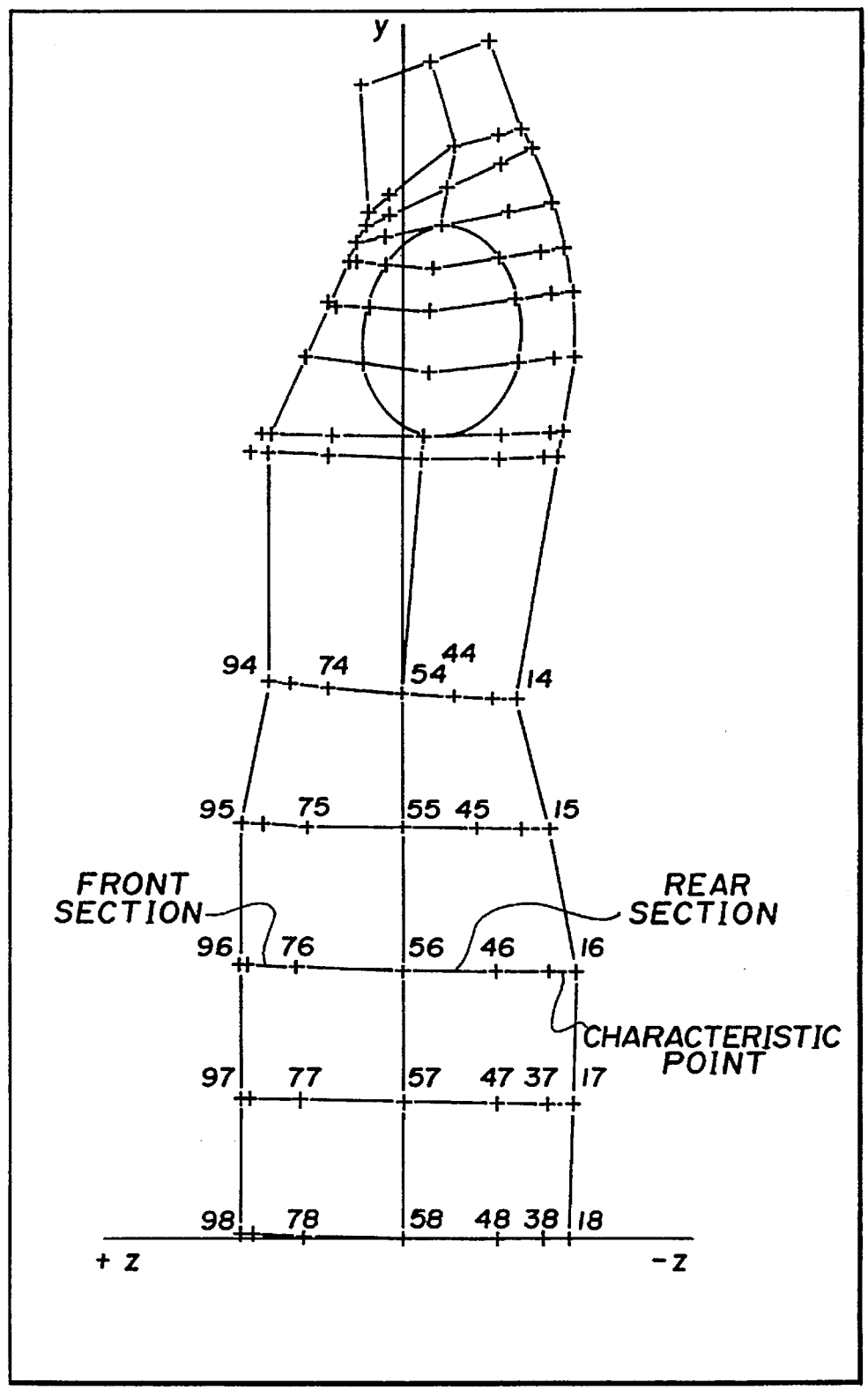
FIG. 7 is a schematic side view showing characteristic points of the dress form in the embodiment according to the present invention.

As shown in FIG. 7, the reference dummy is divided into a plurality of front sections and a plurality of rear sections (both the front and rear sections constitute horizontal cross sections of the present invention), and several points on the circumference of the front and rear sections are determined as characteristic points.

Figure 8:
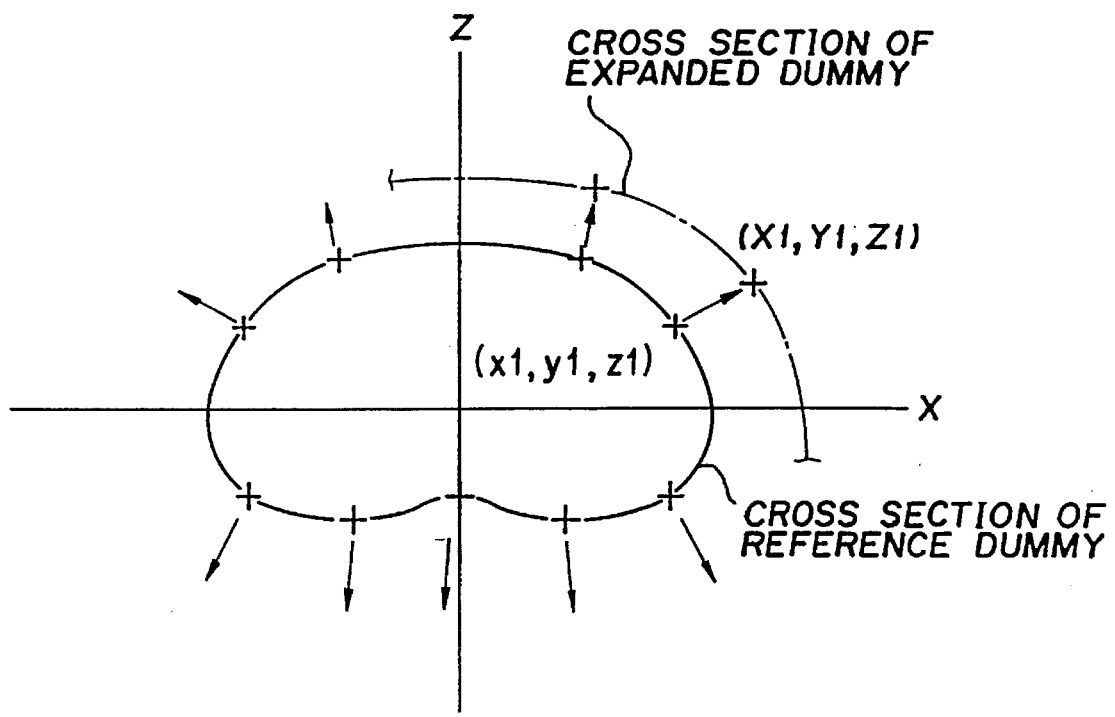
FIG. 8 is a schematic diagram showing an expansion processing of the shape of the dress form in the embodiment according to the present invention.

Cross sectional shape of a section is shown in FIG. 8.

In this embodiment, an estimated three-dimensional shape formed by assembling the sewing patterns is generated by expanding the cross sectional shape of each section by a predetermined expansion factor until the cross sectional shape agrees with the shape feature (major dimensions) shown by the sewing pattern.

For example, characteristic points (x1, y1, z1) in FIG. 8 are expanded to coordinates (X1, Y1, Z1). Assuming that the expansion factor is FC, the coordinate value (three-dimensional coordinate value of the present invention) of the characteristic point at each position is expressed as $$(X_n, Y_n, Z_n) = f(x_n, y_n, z_n, FC) \quad (1)$$

where n is an integer.

Here, a function f takes a different formula for each section. The formula of the function f is determined such that the section after the expansion takes smoother curves as the expansion of the cross section of the reference dummy increases.

The expansion factor FC is defined as a ratio of sizes of the shape feature of the sewing pattern and the feature of the reference dummy corresponding to the shape feature. For this purpose, this embodiment employs the entire circumferential lengths of the neck, shoulder, chest, bust, waist, hip and the like as characteristic factors, and the expansion factor FC is determined by the following equation for each of the characteristic factors.

$$FC = l/L \quad (2)$$

where l and L are the circumference lengths of corresponding sections of the assembled sewing patterns and the reference dummy, respectively, each of the sections being associated with each one of the characteristic factors. Here, some sections associated with the characteristic factors are composed of a front section and a rear section which are not coplanar. In other words, the planes of the front and rear sections are slightly inclined in some sections as shown in FIG. 7.

The above-mentioned function f comprises a function $f_f$ for calculating the expanded section shape at the front, and a function $f_b$ for calculating the expanded section shape at the rear. The function is determined according to each section shape of the reference dummy so that it takes different form for each section.

In this embodiment, each section position is expanded in the height direction based on the inputted length in the height direction of the sewing pattern. This enables to generate more precise shape of assembled sewing patterns, and in addition, makes the reference dummy type independent of the size in the height direction.

The shape data of the sewing patterns will be described with reference to FIG. 9 and FIG. 10.

Figure 9:
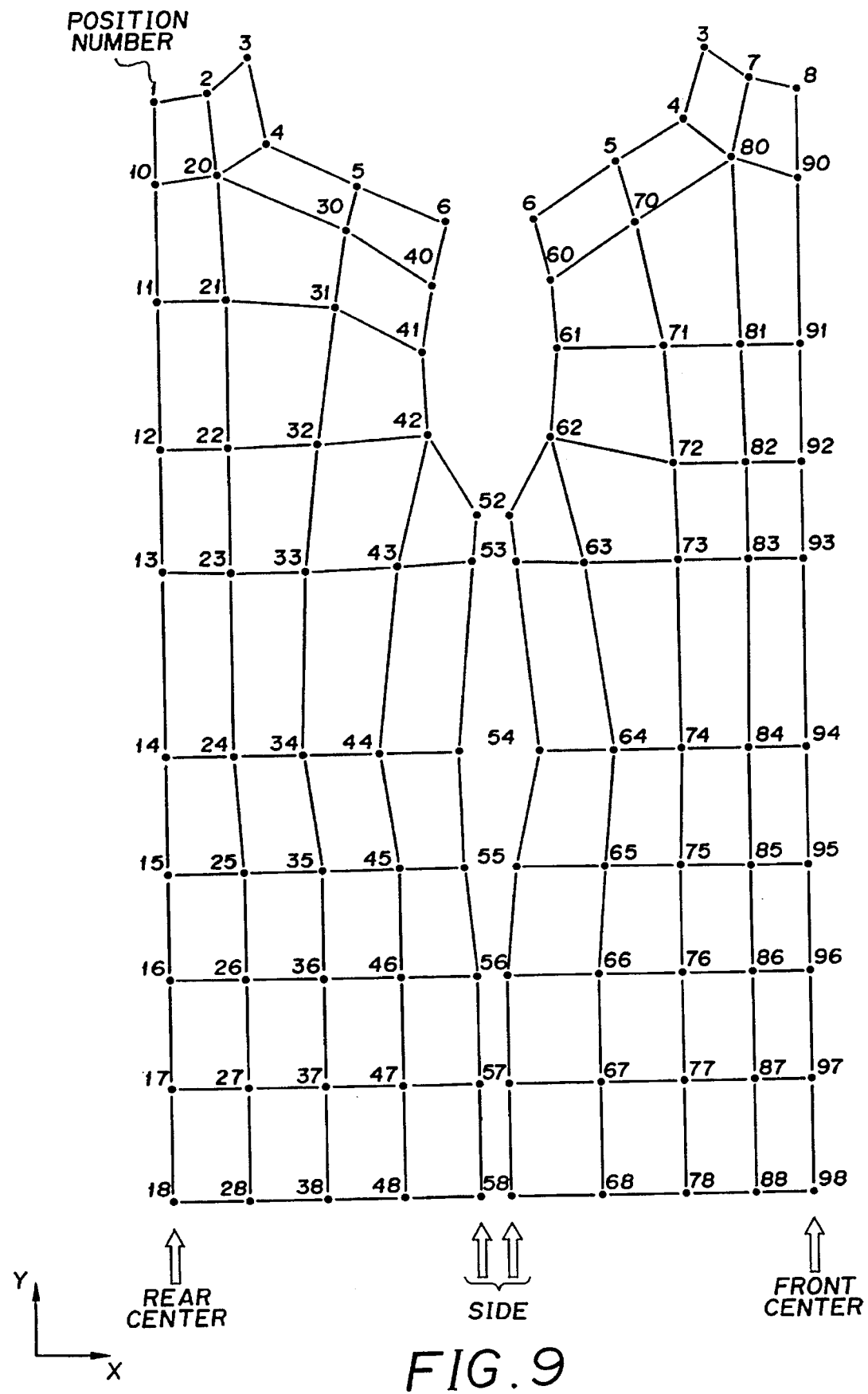
FIG. 9 is a schematic diagram showing characteristic points of the dress form and a sewing pattern.
Figure 10:
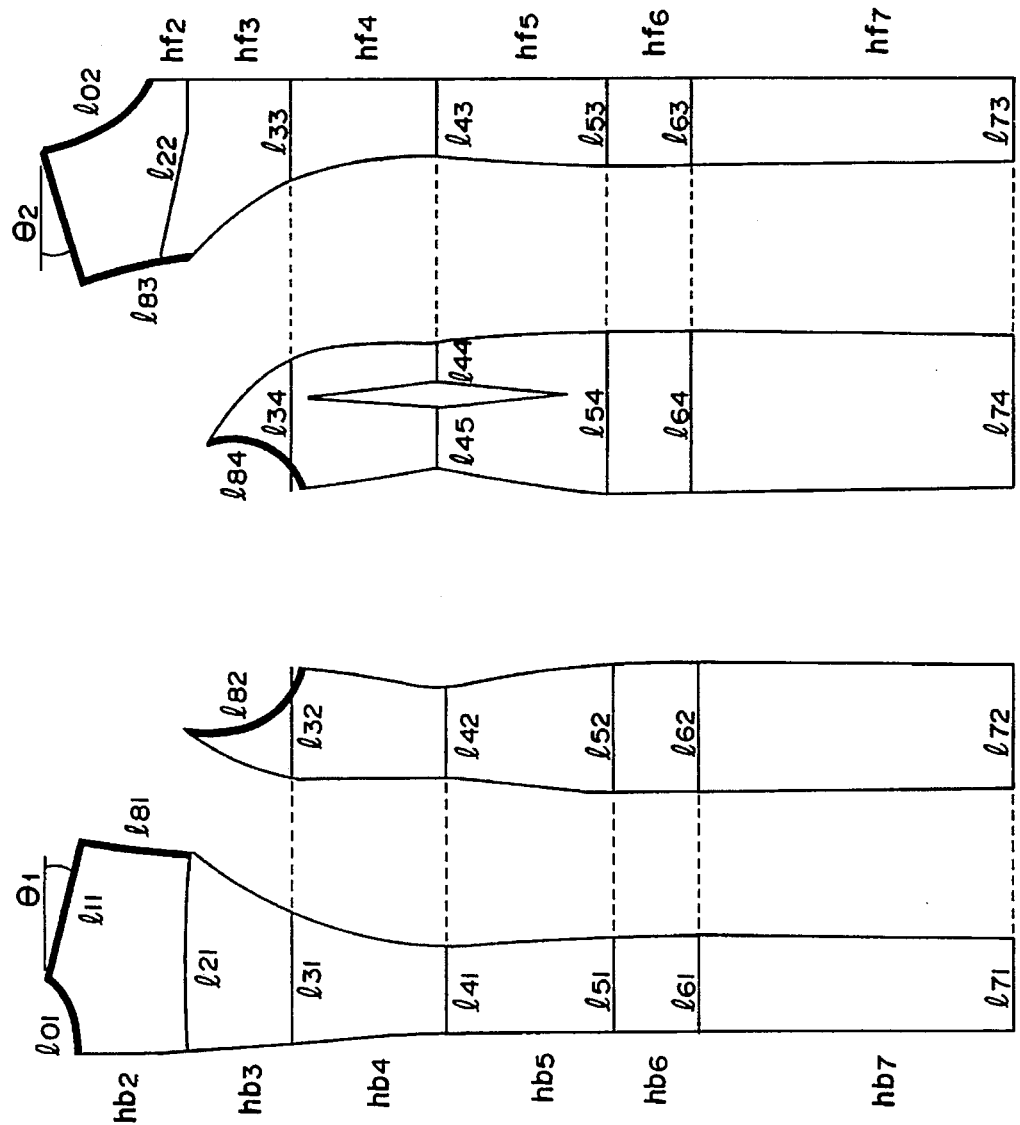
FIG. 10 is a schematic plan view showing locations at which shapes, lengths or the like of sewing patterns are calculated.

When a dress is formed from the four sewing patterns as shown in FIG. 10, the positions of characteristic points corresponding to those of the reference dummy in FIG. 6 are specified on each plane, and each of the characteristic points is provided with an identification number as shown in FIG. 9. The identification number is common to both the sewing pattern and the reference duntroy. Two-dimensional coordinates of respective characteristic points along with the identification numbers are inputted from the two-dimensional shape input unit 60. The lines (represented by 1 in FIG. 10) connecting characteristic points forming the neck line, shoulder line, chest line and the like are computed so that the entire circumferential lengths or the partial lengths of sewing patterns of the front and rear used for calculating the expansion factors are obtained. In addition, the front lengths hf2, hf3, . . . , hf7 in the height direction of the sewing patterns, and the back lengths hb2, hb3, . . . , in the height direction of the sewing patterns are computed.

On the basis of the above description, the operation of the system shown in FIG. 3 will be described with reference to the flow charts in FIGS. 11–14.

Figure 11:
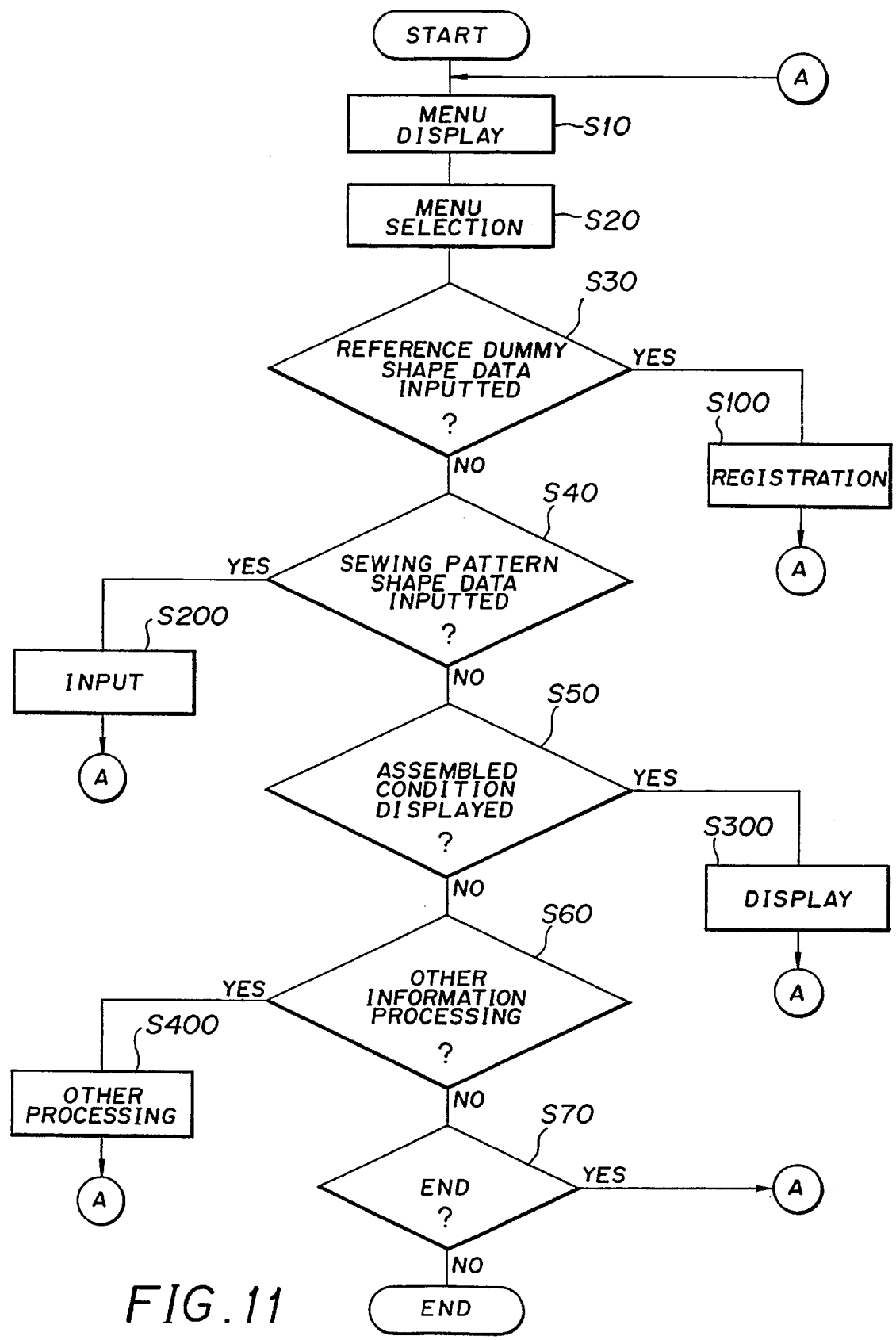
FIGS. 11–13, 14A and 14B are flow charts showing control procedures executed by the CPU 10 in FIG. 3.

FIG. 11 shows a main control procedure for carrying out the image processing associated with the sewing patterns. This main control procedure is executed by the CPU 10 when the power is turned on.

First, the CPU 10 displays a menu of executable processing steps on the display screen of the display unit 40 (step S10 in FIG. 11).

This embodiment provides the following processing steps.
a) Processing for registering the shape data of a new reference dummy:

When a new reference dummy is to be used, this menu is selected to register the shape of the dummy.
b) Processing for inputting the shape data of the sewing patterns:

Prior to displaying the assembled state of the sewing patterns, the plane shape of each sewing pattern to be displayed is inputted.
c) Processing for displaying the assembled state of the sewing patterns:

A two-dimensional projection image of the shape formed by assembling the sewing patterns is generated, and is displayed on the display screen of the display unit 40.
d) Other information processing:

The registered shape data of the reference dummy and the inputted shape data of the sewing patterns are corrected.

Figure 12:
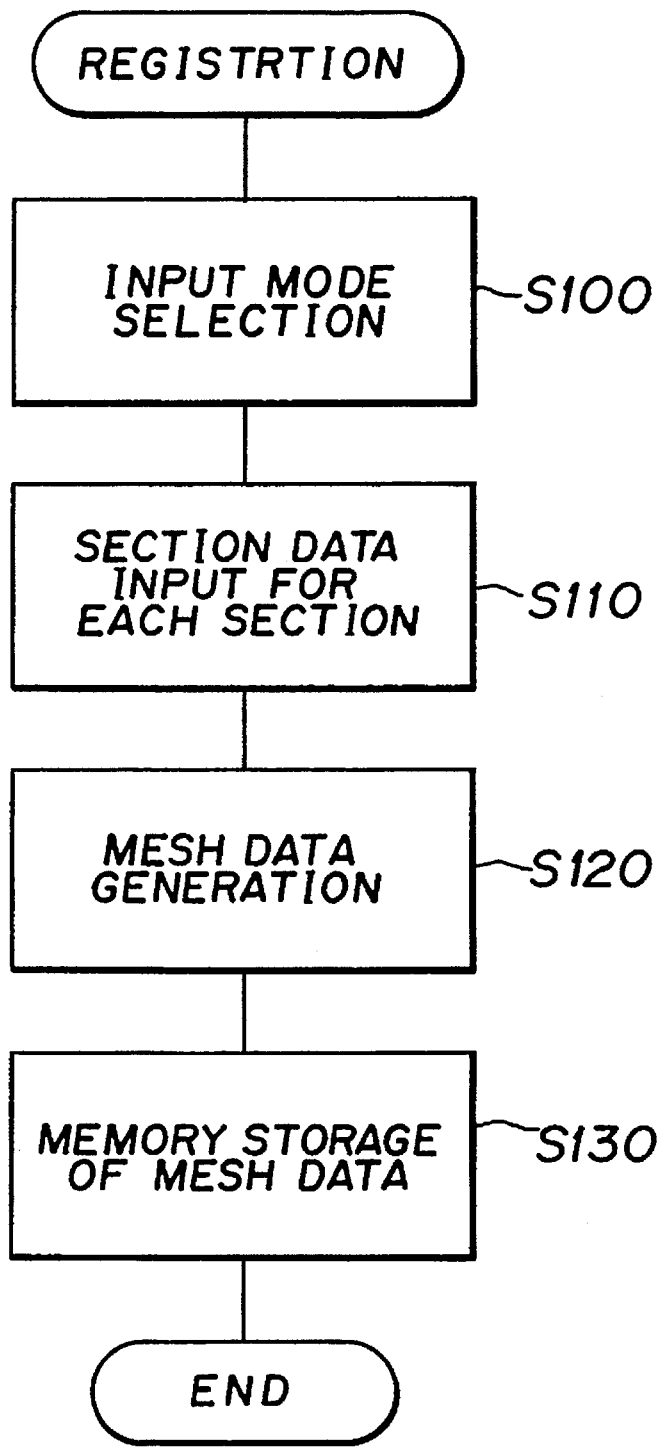

Next, the operator designates a selection menu for the CPU 10 through the keyboard input unit 70 (step S20 in FIG. 11).
(i) Registration processing of the shape data of the reference dummy:

When the shape data registration processing of the reference dummy is selected by the operator, the execution procedure of the CPU 10 moves from step S30 to step S100, and then, the registration processing is executed by the CPU 10 according to the processing procedure shown in FIG. 12. The CPU 10 receives input form instruction from the keyboard input unit 70, and selects an information input device according to the instruction (step S100 in FIG. 12). In this embodiment, the operator can designate as the input form either the input of the shape data measured by the three-dimensional shape input unit 50 or the numerical input of previously prepared shape data entered from the keyboard input unit 70.

When the three-dimensional coordinate value (called section data) of each characteristic point of each section is inputted from the selected input device according to a predetermined format, the CPU 10 stores the data in a dedicated storage area on the RAM 30 (step Si10 in FIG. 12).

The CPU 10 then generates mesh data according to the section data stored on the RAM 30. The mesh data consists of three-dimensional coordinate values of a plurality of points which equally divide the curved line between two adjacent characteristic points. Subsequently, subdivided mesh data is calculated using other adjacent mesh data by an interpolation calculation method called a smoothing technique.

The subdivided portion such as a triangle, a rectangle or the like generated by connecting the adjacent points is called a mesh. When calculating the entire circumferential length of a three-dimensional shape, a distance between individual meshes or an angle between mesh vertices is used. The mesh data is also used when displaying a two-dimensional image of the reference dummy.

The thus generated mesh data along with the section data is registered and stored on the FD 100 through the FDD 90 (step S130 in FIG. 12).

In this case, the data indicating the type and content of the reference dummy such as its sex, body style, age and the like is inputted from the keyboard input unit 70, and is stored in addition to the section data and the mesh data.
(ii) Input of the shape data of the sewing patterns.

Figure 13:
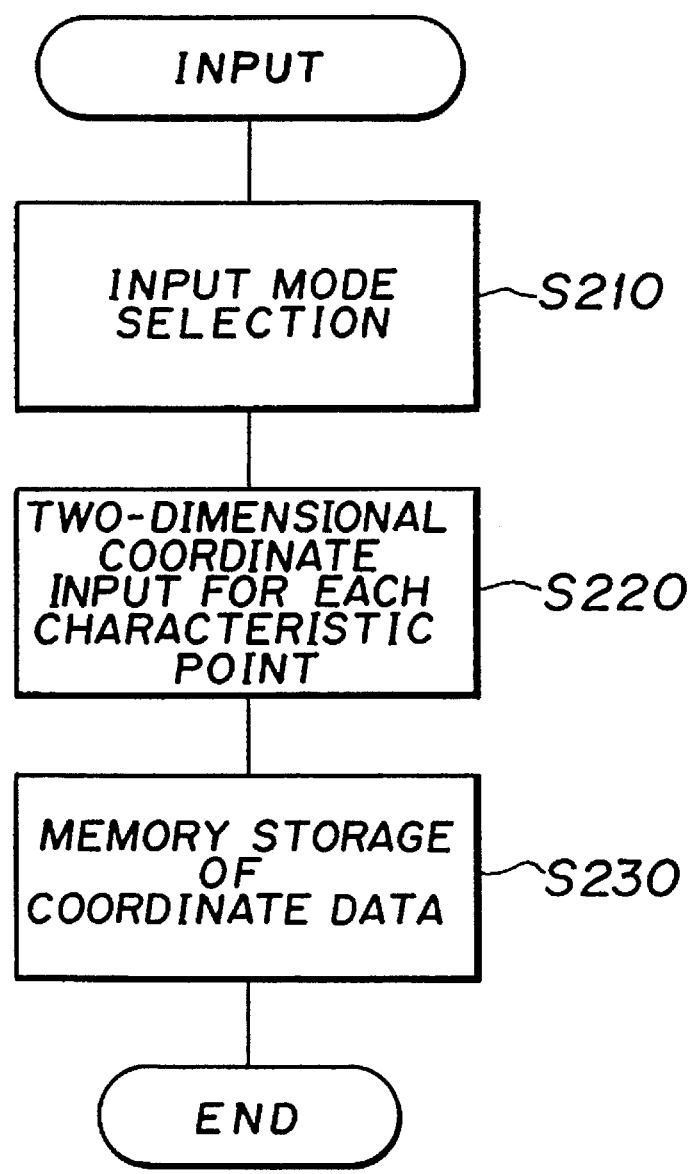

When the operator selects the input processing of the shape data of the sewing patterns at step S20 in FIG. 11, the execution procedure of the CPU 10 moves from step S30, S40 to S200, where the control procedure shown in FIG. 13 is executed.

The CPU 10 receives the instruction on an input device from the keyboard unit 70, and then the sewing pattern shape data is inputted from the instructed device. In this embodiment, either a numerical input from the keyboard input unit 70 or an input from the two-dimensional shape input unit 60 is used.

Figure 14A:
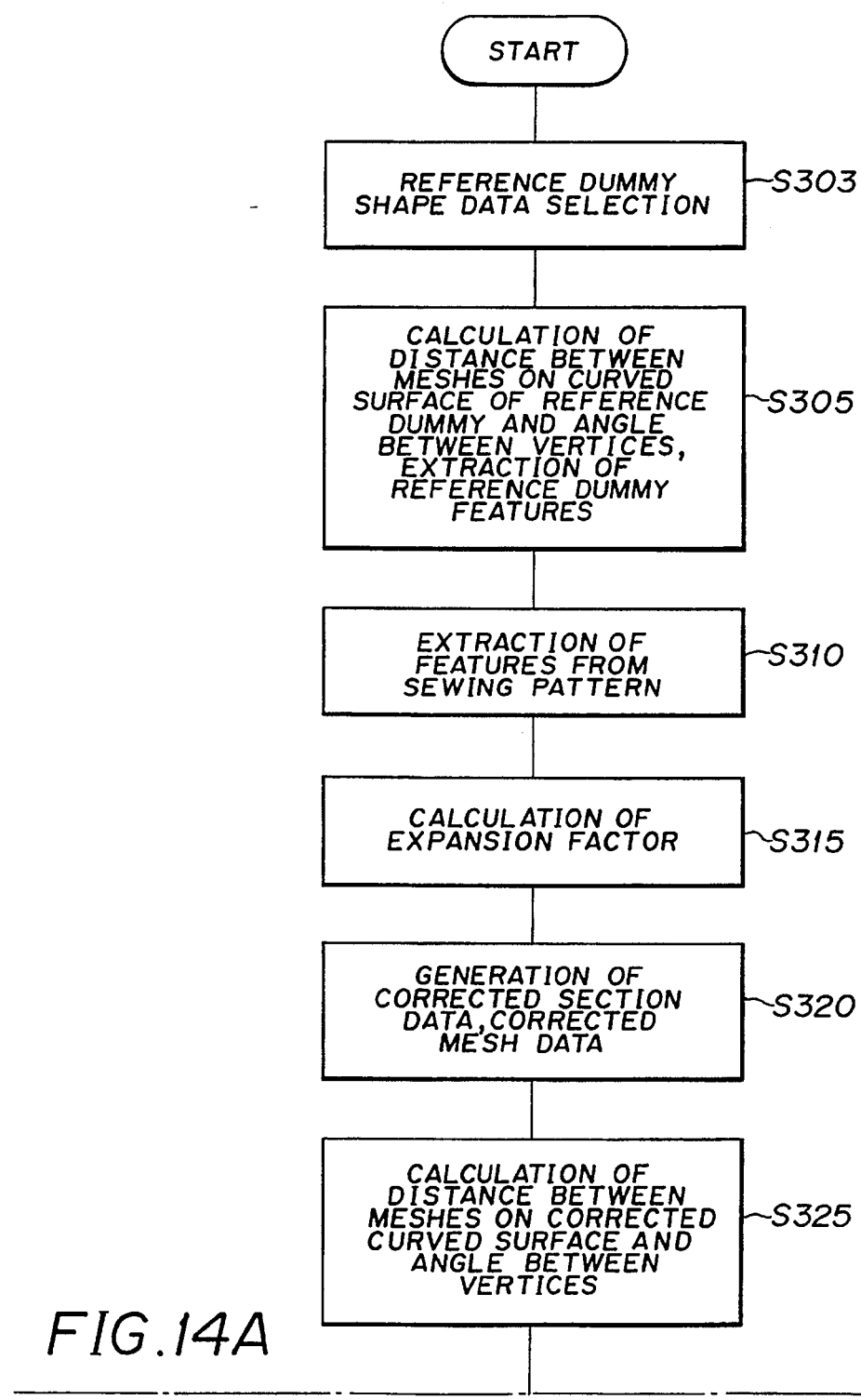
Figure 14B:
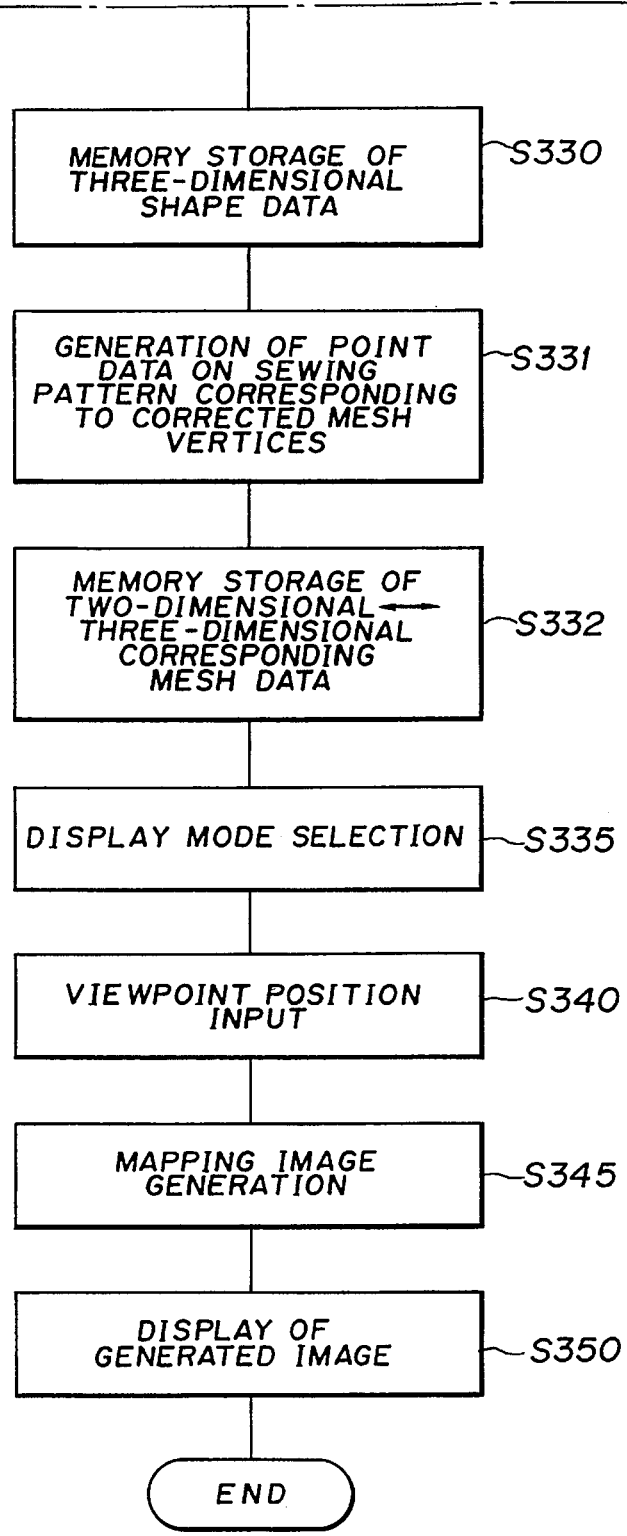

Furthermore, the positions of seam lines when a plurality of sewing patterns are assembled are instructed by inputting identification numbers of characteristic points located on the circumference of each sewing pattern from the keyboard input unit 70 (step S210 to S220 in FIG. 13). The thus inputted sewing pattern shape data is temporarily stored in the dedicated area of the RAM 30 (step S230 in FIG. 13).
(iii) Displaying the assembled condition of the sewing patterns After completing the registration processing of the shape data of the reference dummy and the data input processing of the shape data of the sewing patterns, in the case where the operator selects the display processing of the assembled sewing patterns by the keyboard input unit 70, the execution procedure of the CPU 10 passes through steps S20, S30, S40, S50 and S300 in FIG. 11, where the execution procedures in FIGS. 14A and 14B are executed.

When the operator inputs search data for the data base such as a body style, sex, age and the like from the keyboard input unit 70, the CPU 10 reads the reference dummy shape data (the section data and mesh data) which agrees with the search data from the FD 100 through the FDD 90, and stores the shape data in the dedicated area on the RAM 30 (step S303 in FIG. 14). The FDD 90 operates at this time as the input means for inputting the three-dimensional coordinate values associated with the dress form in the present invention.

The CPU 10 then selects mesh data connecting predetermined characteristic points in order to calculate the entire circumferential lengths and the lengths in the height direction of the characteristic factors such as the neck line, shoulder line, chest and the like. After the distances between the respective selected meshes are calculated, the individual distances are summed up to calculate each of the entire circumferential lengths and lengths in the height direction of the respective characteristic factors (step S305 in FIG. 14A).

The CPU 10 then selects specific data of the sewing pattern shape data to calculate the entire circumferential length of each characteristic factor (such as the neck line and chest line; see, FIG. 10). If partial sizes associated with a characteristic factor cannot be obtained from the shape data of a single sewing pattern like 132 and 134 in FIG. 10, calculations are made using the shape data of other sewing patterns (step S310 in FIG. 14A).

The calculated data is temporarily stored on the RAM 30 and read again in subsequent calculation steps by the CPU 10 (described later). Thus, the CPU 10 in reading operation constitutes, together with the two-dimensional input unit 60, the input means for inputting the main dimensions of the sewing patterns in the present invention.

Figure 15:
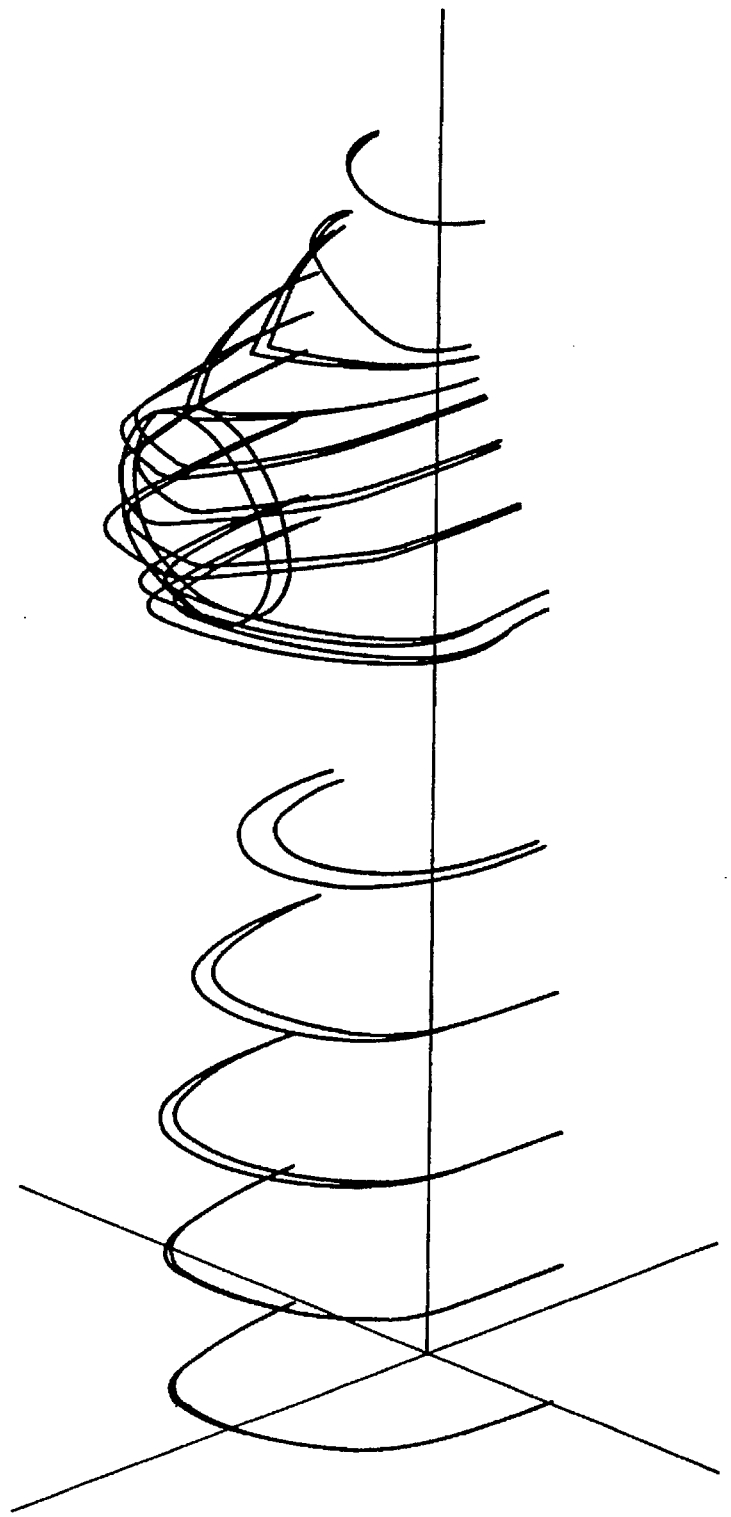
FIG. 15 is a schematic perspective view showing an expansion processing of the shape of the dress form in the embodiment according to the present invention.
Figure 16:
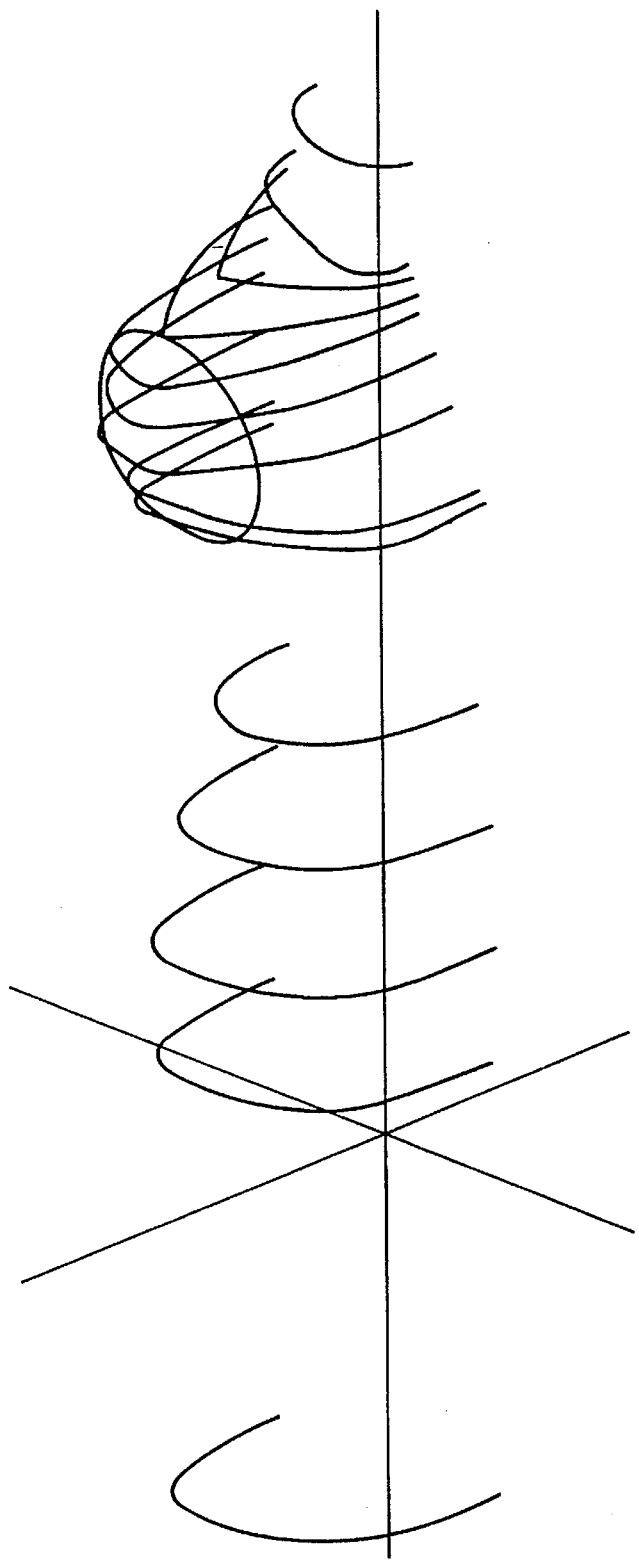
FIG. 16 is a schematic perspective view showing an expansion processing of the shape of the dress form in the embodiment according to the present invention.

The CPU 10 then calculates the expansion factor FC of each characteristic factor from the entire circumferential length of each section of the reference dummy and the shape formed by assembling the sewing patterns by using equation (2), and the three-dimensional coordinate value of each characteristic point after the reference dummy is expanded in accordance with equation (1), i.e. corrected section data (step S325 in FIG. 14A). Furthermore, the CPU 10 calculates the expansion factor in the height direction from the height direction lengths of the sewing patterns and the height direction lengths of the reference dummy. As described above, it is needless to say that equation (1) is set to be different for every characteristic factor considering the dummy shape and comfortableness of the dress. FIG. 15 is a schematic view illustrating the expanded horizontal cross section of each characteristic factor, and FIG. 16 is a schematic view based on FIG. 15 further expanded in the height direction.

The CPU 10 in this case operates as the calculation means of the present invention. Corrected mesh data for displaying is generated from the calculated corrected section data. Each distance between respective meshes and each angle between mesh vertices is calculated according to the corrected mesh data. The data calculated in steps S320 and S325 is temporarily stored in the work area of the RAM 30 (step S330 in FIG. 14B). Then, using the distances between the individual meshes and the angles between mesh vertices of the corrected mesh data, the data of the three-dimensional coordinate corresponding to the two-dimensional coordinate are generated for each mesh point by obtaining data positions on each sewing pattern (steps S331 and S332 in FIG. 14B). After that, the CPU 10 displays the types of assembled images that can be displayed on the screen of the display unit 40, and waits for an instruction of the operator. In this embodiment, it is possible to display the following assembled images.

(aa) A two-dimensional projection image obtained by illuminating, from a particular position, the shape formed by assembling the sewing patterns, the image including no connection lines of the assembled sewing patterns.

Figure 17:
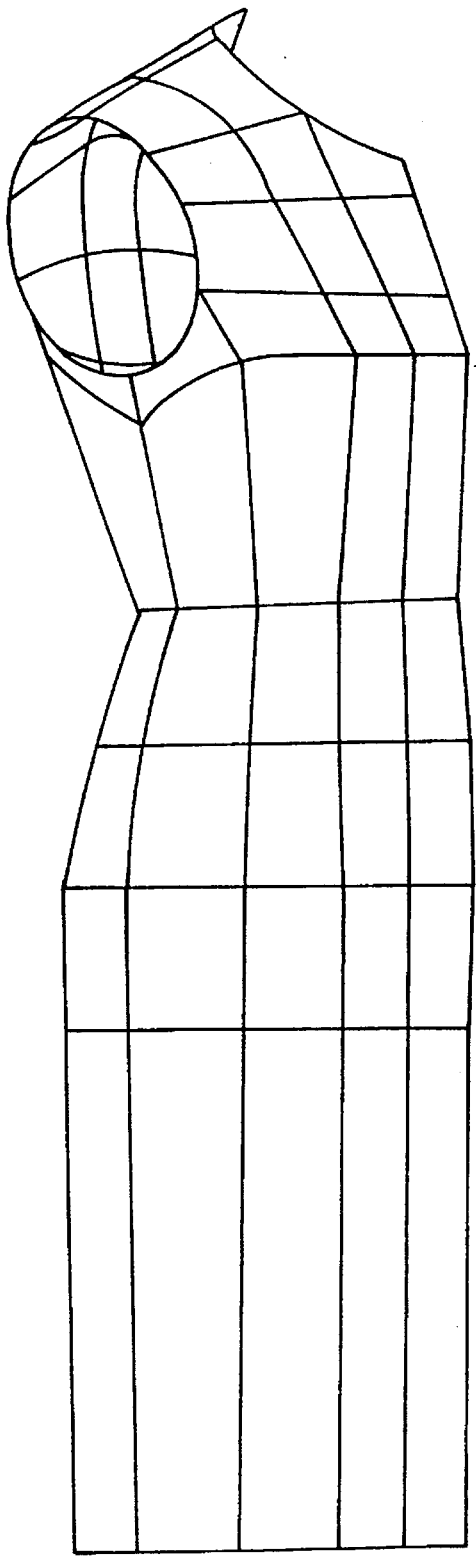
FIGS. 17–19 are schematic perspective views showing display forms of the embodiment according to the present invention.

(bb) An image of (aa) plus lines connecting characteristic points (see, FIG. 17).

Figure 18:
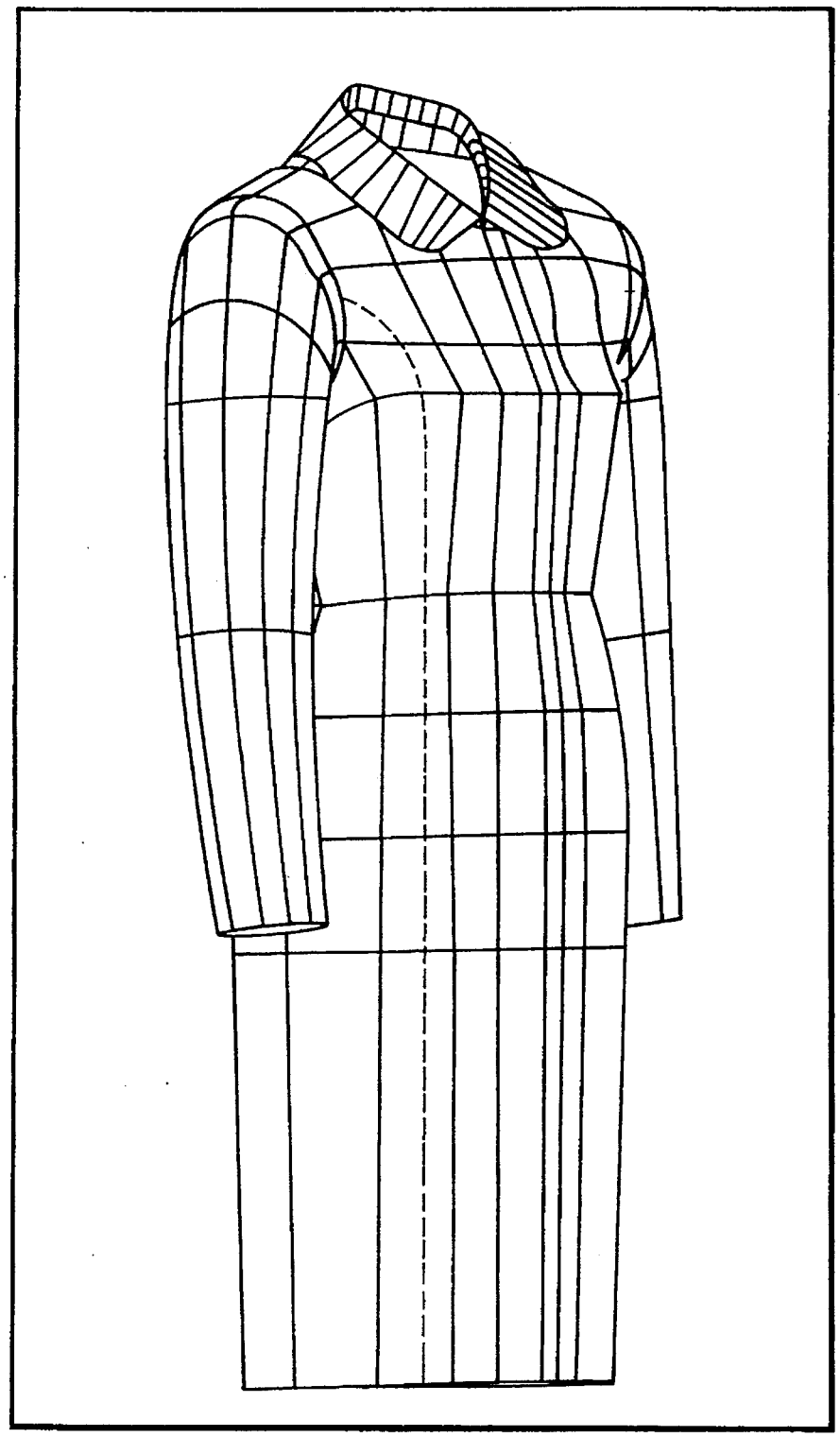

(cc) An image of (bb) plus seam lines of the sewing patterns to emphasize the design image (FIG. 18).

Figure 19:
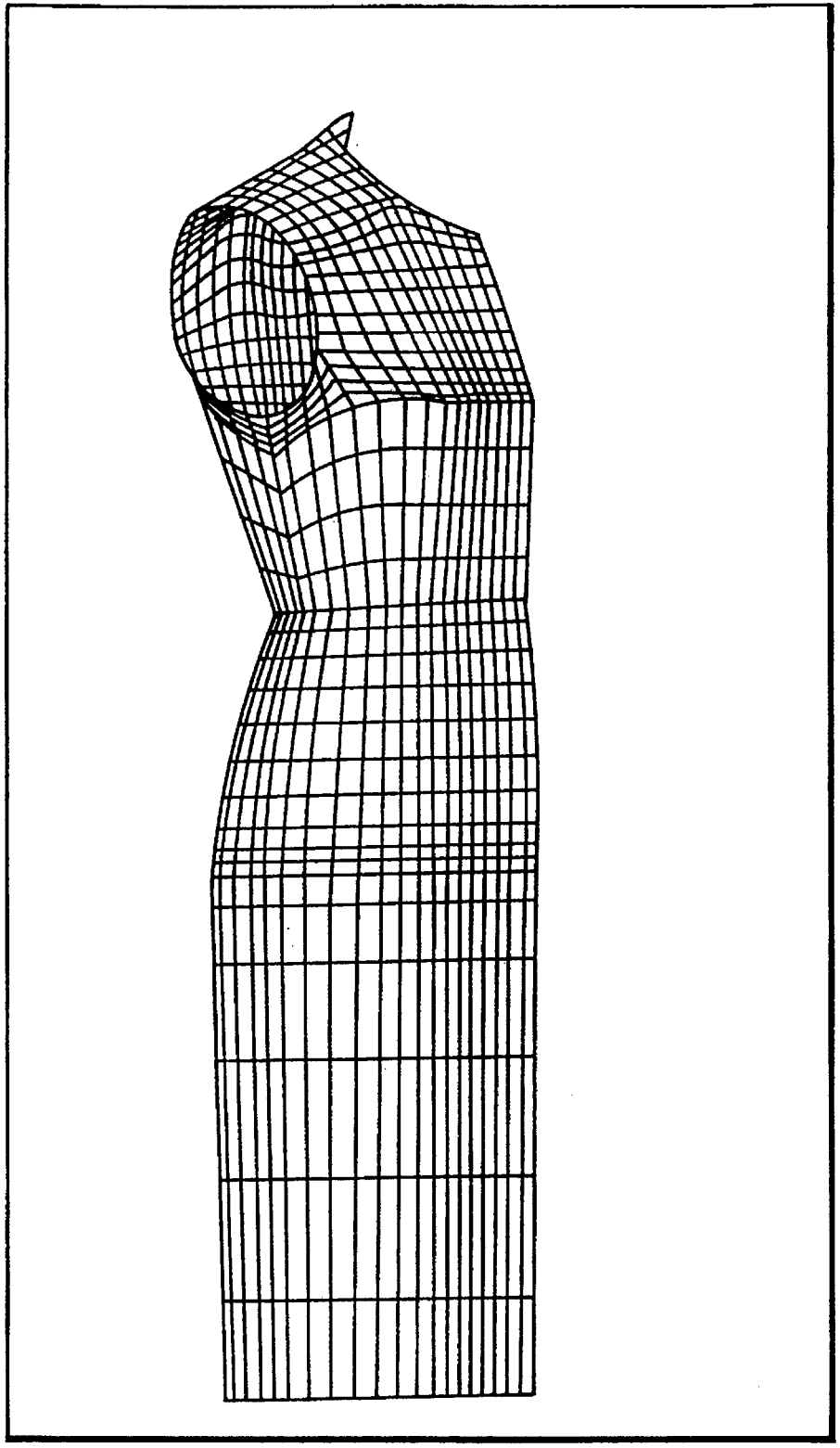

(dd) An image of (aa) plus lines connecting coordinate positions indicating the corrected subdivided mesh data (FIG. 19).

Figure 20:
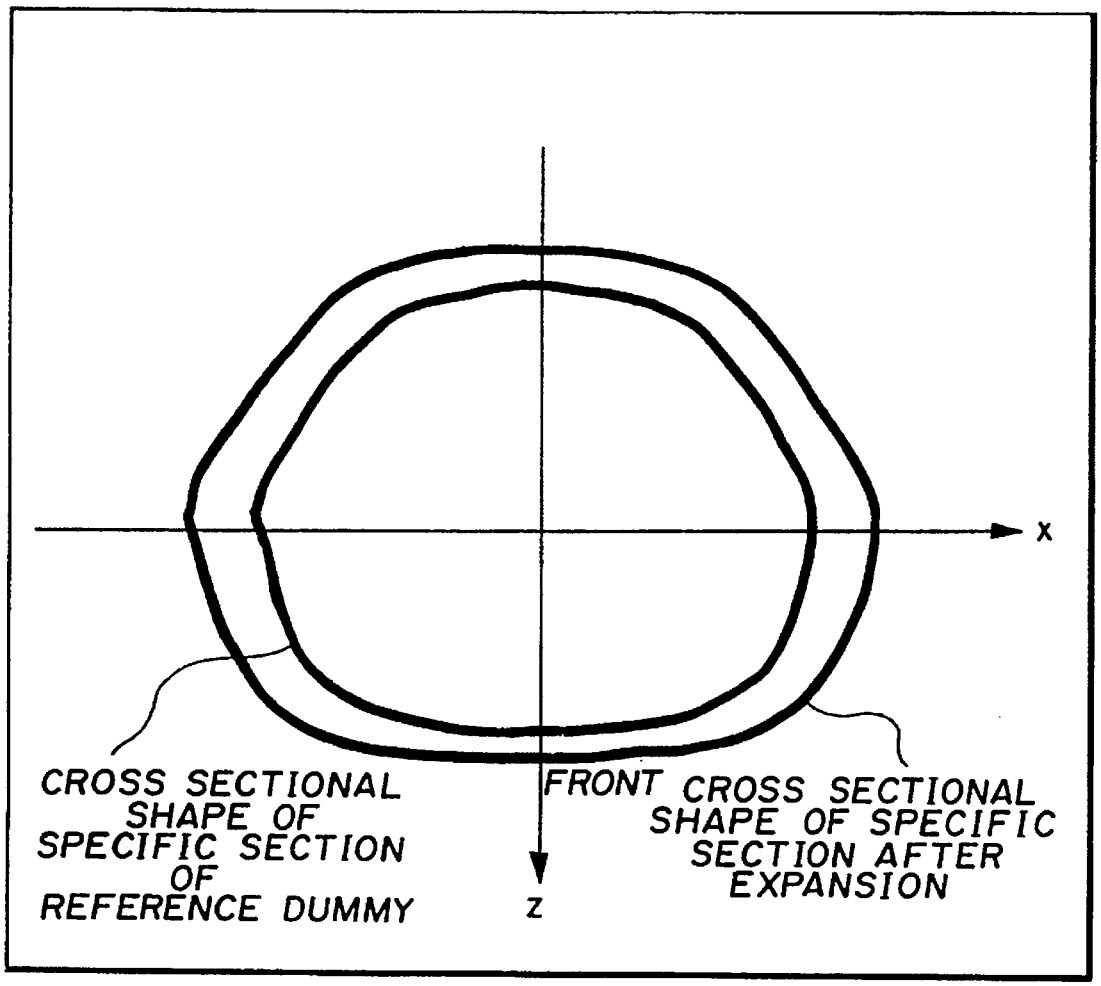
FIGS. 20–22 are schematic diagrams showing display forms of the embodiment according to the present invention.

(ee) An image of cross sections of the reference dummy and the shape formed by assembling the sewing patterns (the expanded shape of the reference dummy) at a particular section (FIG. 20).

Figure 21:
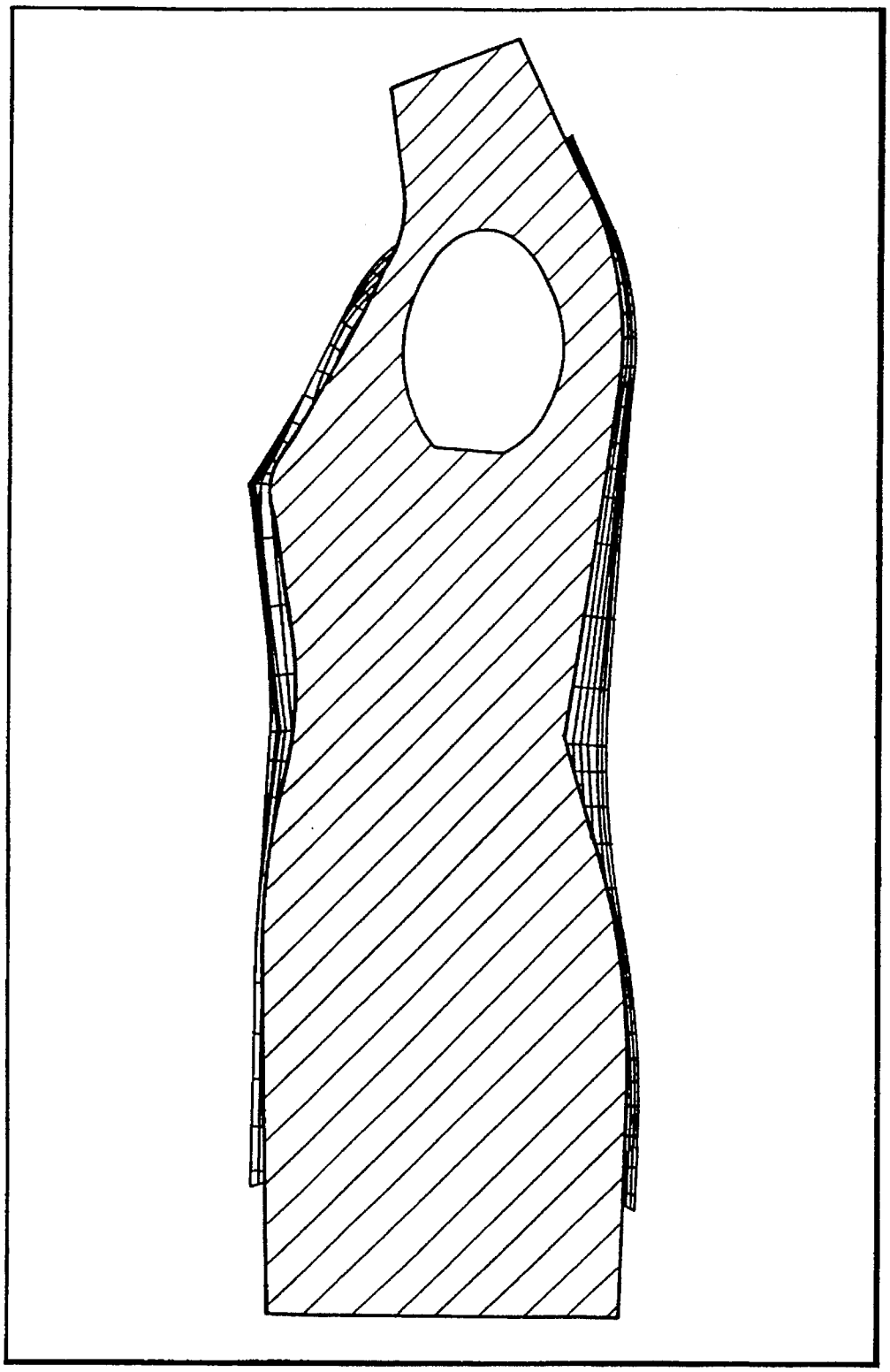

(ff) A cross sectional image along the median line of the reference dummy and the shape of assembled sewing patterns (FIG. 21).

Subsequently, the CPU 10 receives from the keyboard input unit 70 the data about the viewpoint position of the shape of the assembled sewing patterns, and generates a two-dimensional projection image of the assembled shape viewed from the viewpoint position indicated by the data. In this case, the CPU 10 operates as the image processing means of the present invention. The method for a two-dimensional projection is a well-known technique, and hence, the description thereof is omitted here. After that, the CPU 10 generates an image according to the selected display form.

The (aa) image is generated by computing the brightness at the coordinate positions indicated by the corrected mesh data after expansion from the intensity and position of a light source, and by expressing in shading the corresponding positions of the two-dimensional projection image according to the brightness.

The (bb) image is generated by selecting the mesh data which are present within the visual field out of the expanded mesh data, and by adding, to the (aa) image, images of lines connecting two-dimensional projection positions of the selected mesh data by using the CPU 10.

The (cc) image is generated by adding, to the (bb) image, images of lines connecting the two-dimensional projection positions associated with the coordinate data in each seam line mesh by the CPU 10 (the portion indicated by the broken line in FIG. 18). This is performed because the two-dimensional coordinates on the sewing patterns for each mesh, as well as the three-dimensional coordinate values of the corresponding expanded mesh are previously inputted.

The (dd) image is generated by calculating the two-dimensional projection positions present within the visual field out of the expanded mesh data after correction, and by adding images of lines connecting the calculated two-dimensional projection positions.

The (ee) image is generated by receiving the instruction on sections from the operator through the keyboard input unit 70, and generating a cross sectional image by the CPU 10 from the coordinate values on the x-z plane (FIG. 6) associated with the mesh data before and after the correction on the instructed section.

The (ff) image is generated by extracting, from the mesh data before and after the correction, the mesh data positioned on each circumference of the cross sections from Front center to Rear center, and by generating a cross sectional image by the coordinate values on the y-z plane (FIG. 6) of the extracted mesh data. In this case, the wearing condition of the dress can be estimated by forming a silhouette image as shown in FIG. 21 by filling the side cross section of the reference dummy with a specific color. The cross sectional position can be arbitrarily set by specifying the position on the two-dimensional projection image which is being displayed by means of the coordinate input unit 80. Frequently used cross sectional positions such as those from Front Center to Rear Center and waist line may be previously registered for subsequent selection. Furthermore, dimensions of margins may be displayed on the display screen.

The shape formed by assembling the sewing patterns can be better represented in three-dimensional fashion when it is displayed by lines connecting the corrected mesh data as shown in FIG. 21.

As described above, in this embodiment, the reference dummy is expanded and changed according to the outer circumferential lengths of a plurality of specific sections which are not affected by the shape formed by assembling the sewing patterns, and three-dimensional coordinate values representing the three-dimensional shape of the changed reference dummy are calculated using a predetermined calculation equation. Regarding the expanded shape as the shape of the assembled sewing patterns, the three-dimensional coordinate data for three-dimensional display of the sewing patterns is obtained, thereby making it possible to estimate the shape of assembled sewing patterns in a condition close to the state wearing the dress.

Next, using the correlation between the two-dimensional data of the sewing patterns and the three-dimensional coordinate data for displaying the three-dimensional shape of the assembled sewing patterns, a visible display of the cloth pattern can be obtained by mapping the actual cloth pattern of the dress on the surface of the three-dimensional shape of the expanded reference dummy and by displaying it.

Figure 22:
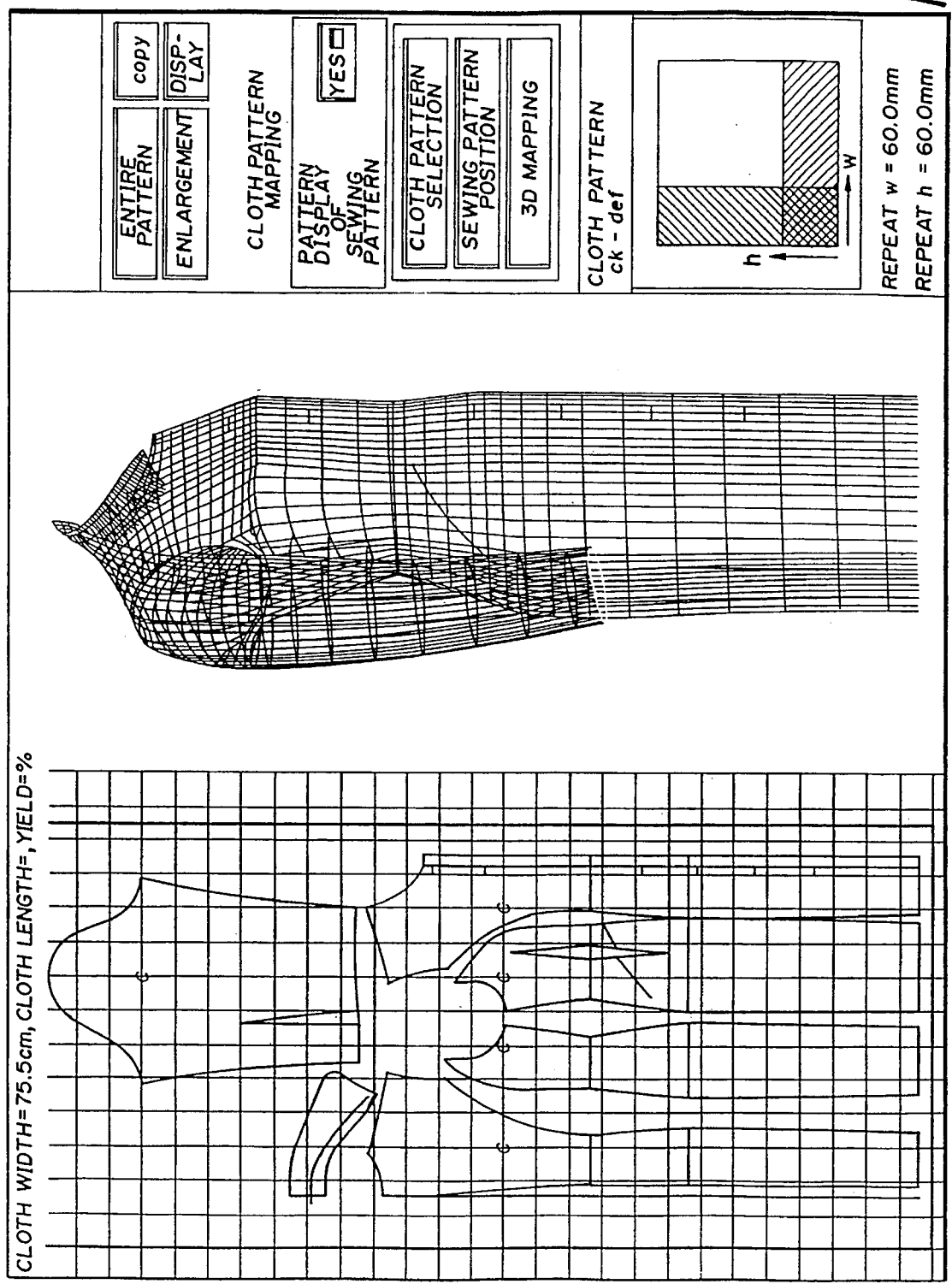

In this embodiment, after completing the display processing at step S300, selection of the cloth pattern, arrangement of the sewing patterns, or the mapping processing can be carried out by selecting a "cloth pattern mapping" mode on the display screen as shown in FIG. 22.

In FIG. 22, the following modes are provided:
(aaa) cloth pattern selection
(bbb) sewing pattern arrangement
(ccc) 3D mapping.

(aaa) In the cloth pattern selection mode, unit cloth pattern data which has been previously registered is displayed in a predetermined menu area on the display unit 40. The cloth pattern data are inputted from two-dimensional shape input unit 60 and recorded to FD100 through FDD90 by CPU10. For example, as shown in FIG. 22, cloth pattern ck-def can be selected and the color and pattern interval (w, h) can be set as garment to generate the cloth pattern of an actual dress. The color can be specified by a previously registered color number. The color numbers are allocated for a plurality of colors with specified hue, chroma, and color value.

(bbb) In the sewing pattern arrangement mode, a cloth pattern of a specified width is displayed on the display unit 40 according to the cloth pattern data selected on the above-mentioned menu. In this case, to facilitate the operation, perpendicularly crossing lines indicating the repetition length of the cloth pattern is displayed for every sewing pattern interval (w, h) of the unit cloth pattern data. By selecting a "pattern display of the sewing pattern" mode in FIG. 22, an actual cloth pattern can be displayed instead of the perpendicularly crossing lines.

Then, the operator determines the positions of the sewing patterns by first overlapping the patterns of the sewing patterns on the cloth and displaying them, and then, by moving the designated sewing pattern to an arbitrary position on the screen, by freely operating an input unit such as the coordinate input unit or the keyboard. In this case, the following conditions should be met.

1) The sewing patterns are provided with seam allowances.
2) The sewing patterns do not overlap each other.
3) The sewing patterns are placed within the cloth width.

Figure 23:
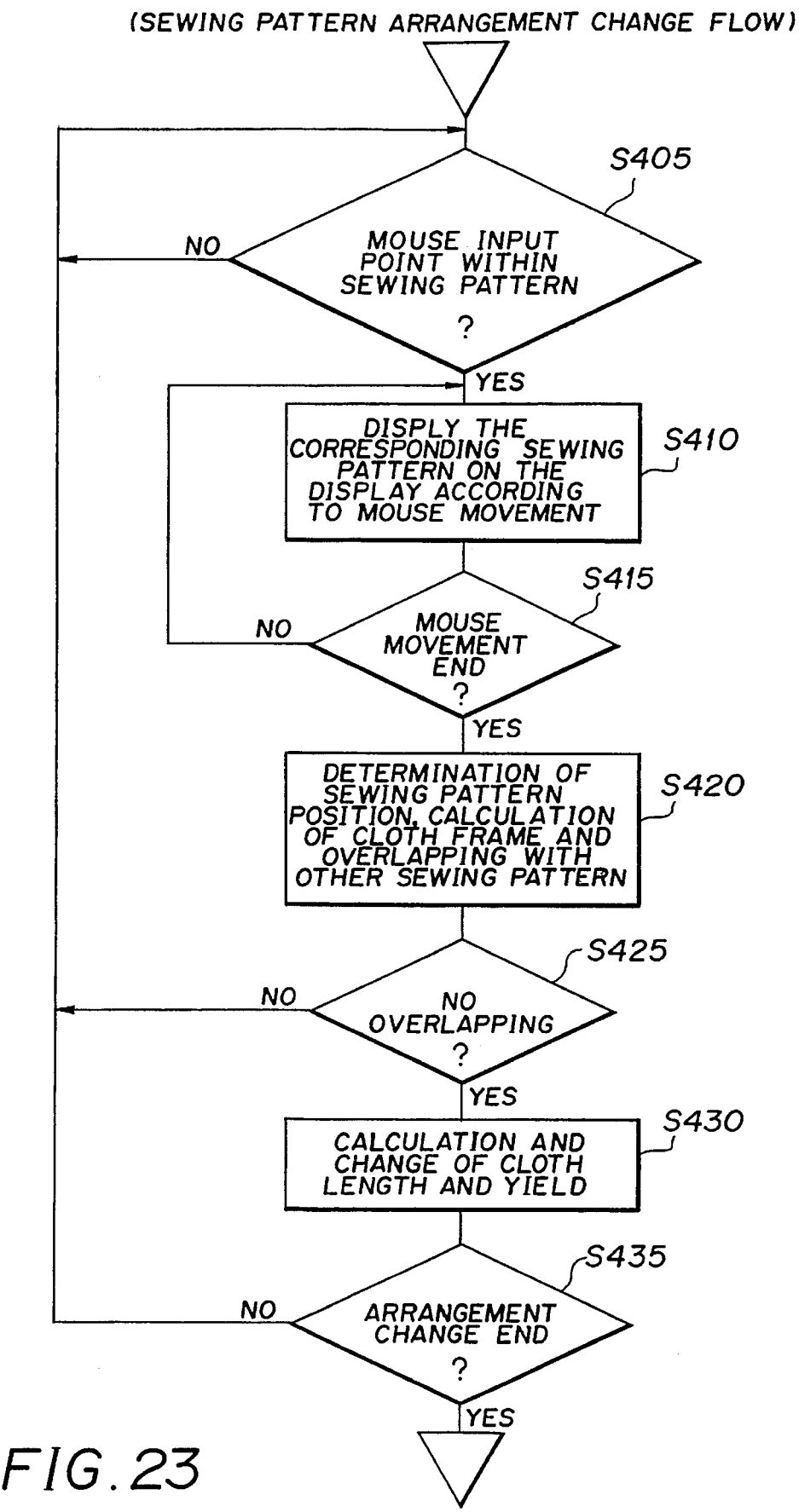
FIGS. 23 and 24 are flow charts showing control procedures executed by the CPU 10 in FIG. 3.

In this embodiment, the direction of the sewing patterns is fixed (not rotated). Thus, the sewing patterns can be placed to cut the cloth. Furthermore, the areal ratio of the sewing pattern to the cloth (yield) is calculated and outputted. FIG. 23 shows the processing of the sewing pattern arrangement. At step S405, it is determined whether or not the input point from the mouse of the coordinate input unit 80 is within the sewing pattern, and the sewing pattern is moved according to the movement of the mouse at step S415. Then, at step S420, the above-mentioned conditions 1)–3) are calculated, and finally the yield is calculated (step S435).

Figure 24:
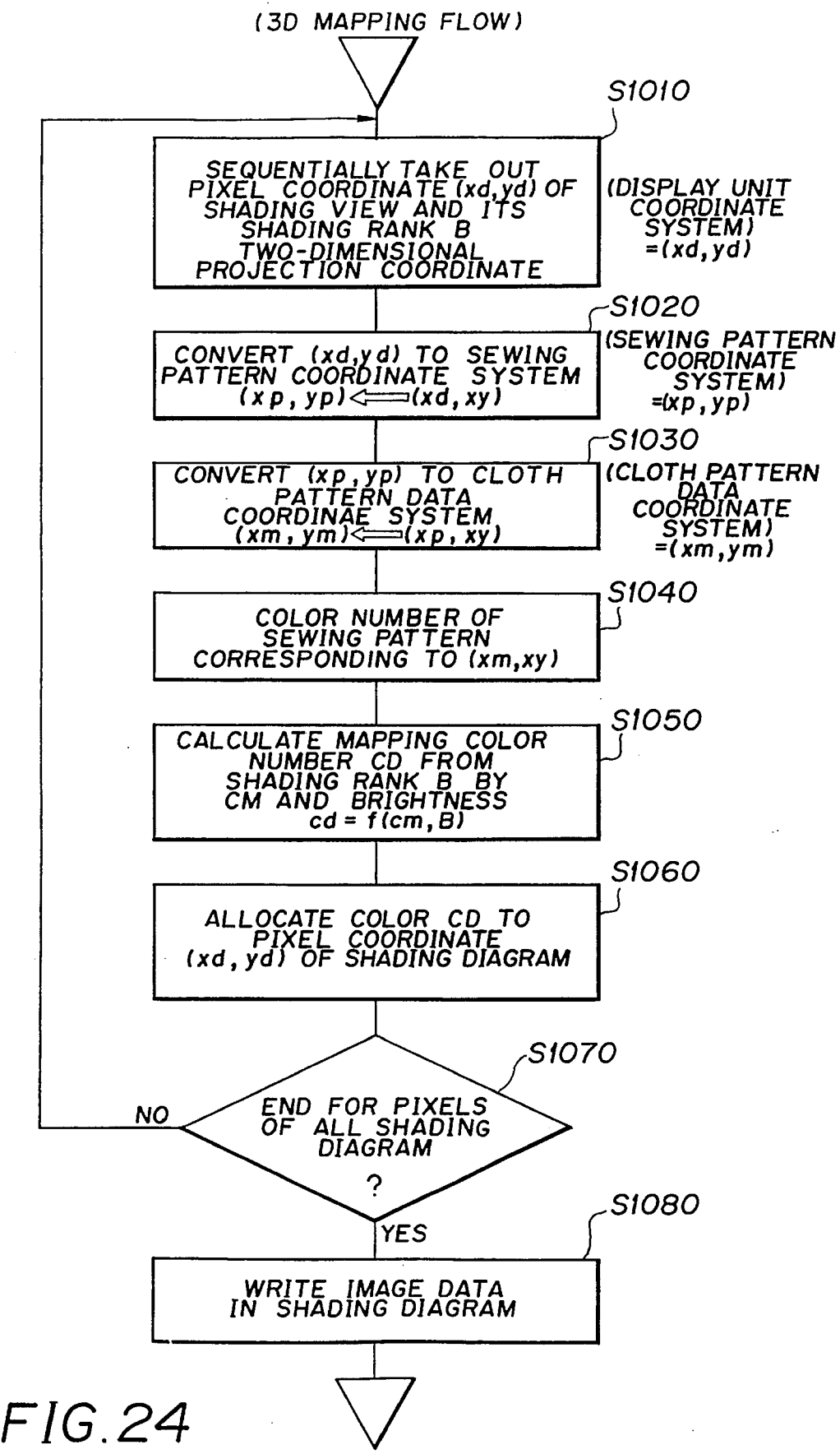
Figure 25A:
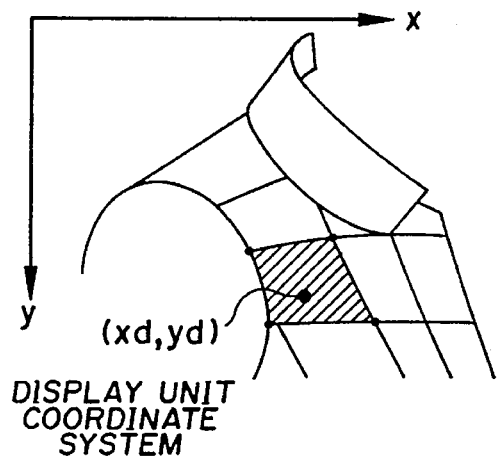
FIGS. 25A–25C are schematic diagrams showing relationships between two-dimensional projection coordinates, two-dimensional sewing pattern coordinates, and cloth pattern coordinates.
Figure 25B:
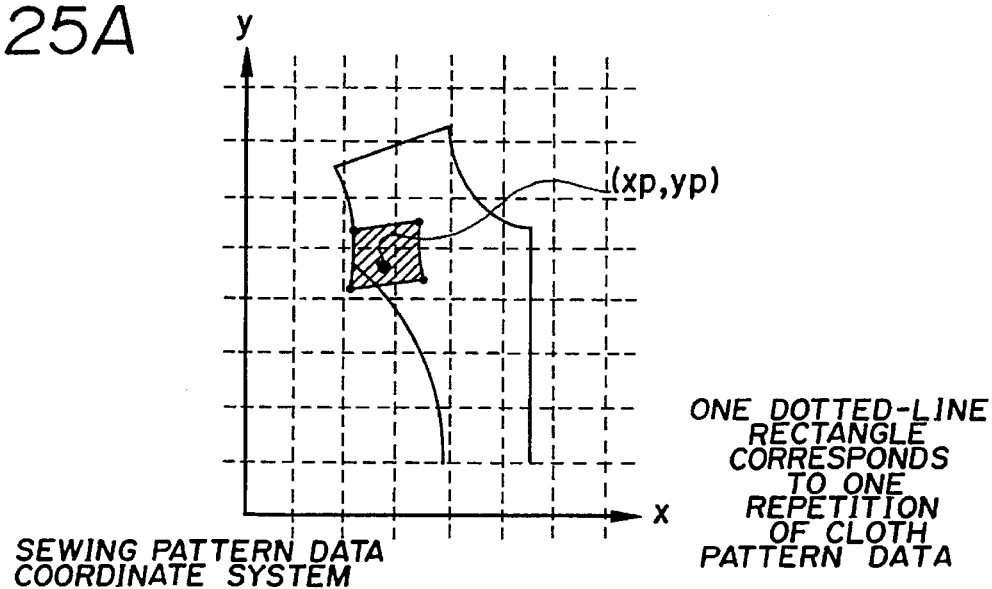
Figure 25C:
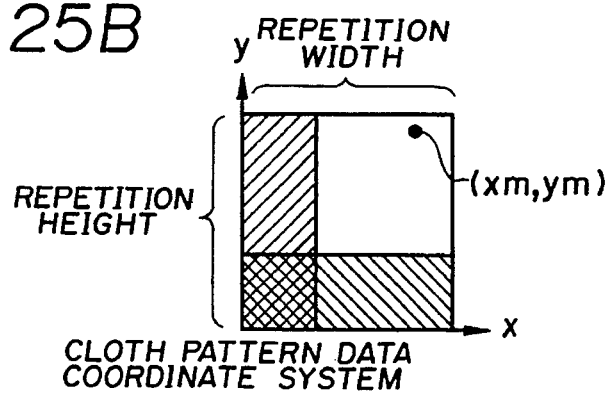

(ccc) In the 3D mapping mode, the cloth pattern is mapped onto the two-dimensional projection image representing the three-dimensional shape. Here, an image of the shape of the assembled sewing patterns is displayed on the screen with the cloth pattern as follows: First, the position of the two-dimensional projection image associated with the three-dimensional data displayed on the display unit is located on the sewing patterns by performing computation on the two-dimensional mesh data and the corresponding three-dimensional mesh data stored on the RAM 30. Second, the color number of the cloth pattern at that position on the sewing pattern is selected to provide shading on the color pixels there in accordance with the brightness on the two-dimensional projection image. The processing procedure of the 3D mapping is shown in FIG. 24. In addition, schematic diagrams showing the coordinates needed to perform the computation are illustrated in FIGS. 25A–25C.

Figure 26:
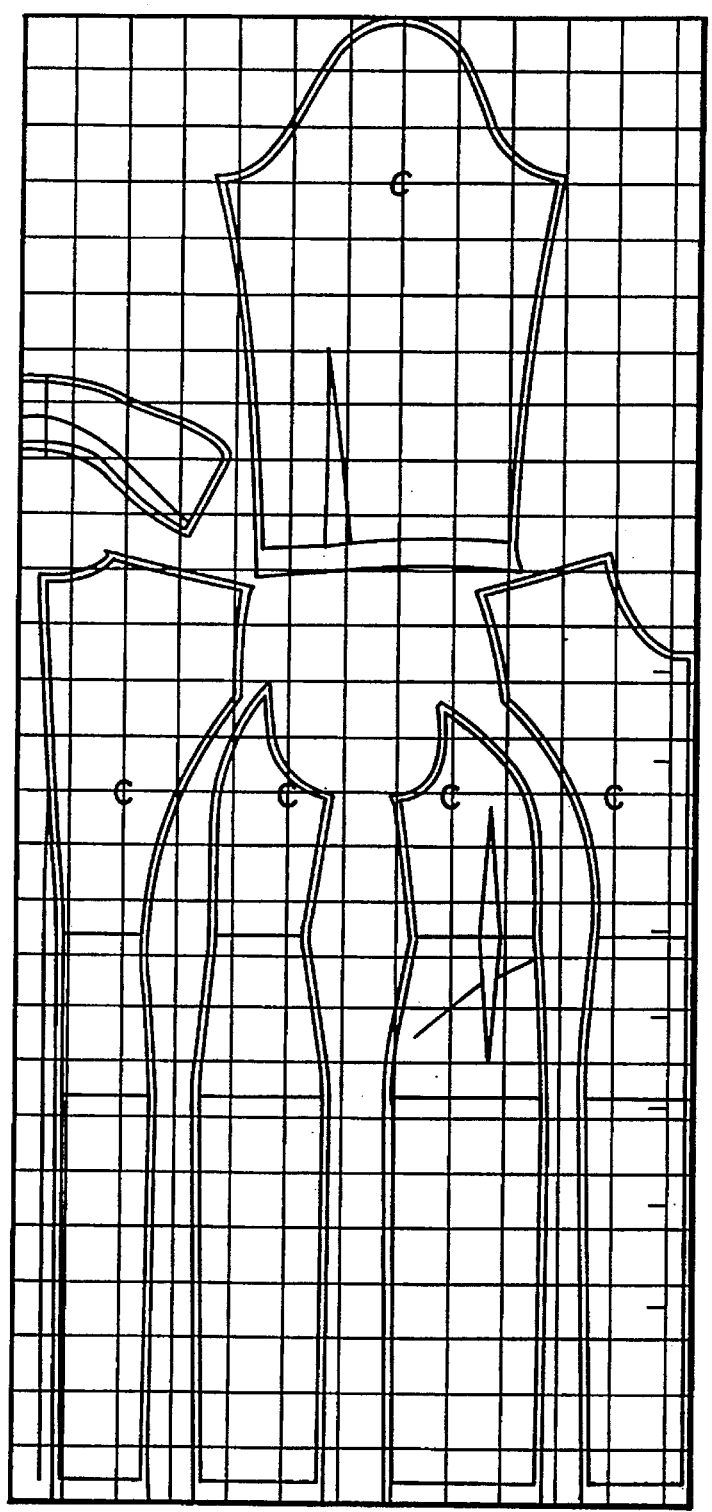
FIG. 26 is a schematic diagram showing sewing patterns placed on a cloth.
Figure 27:
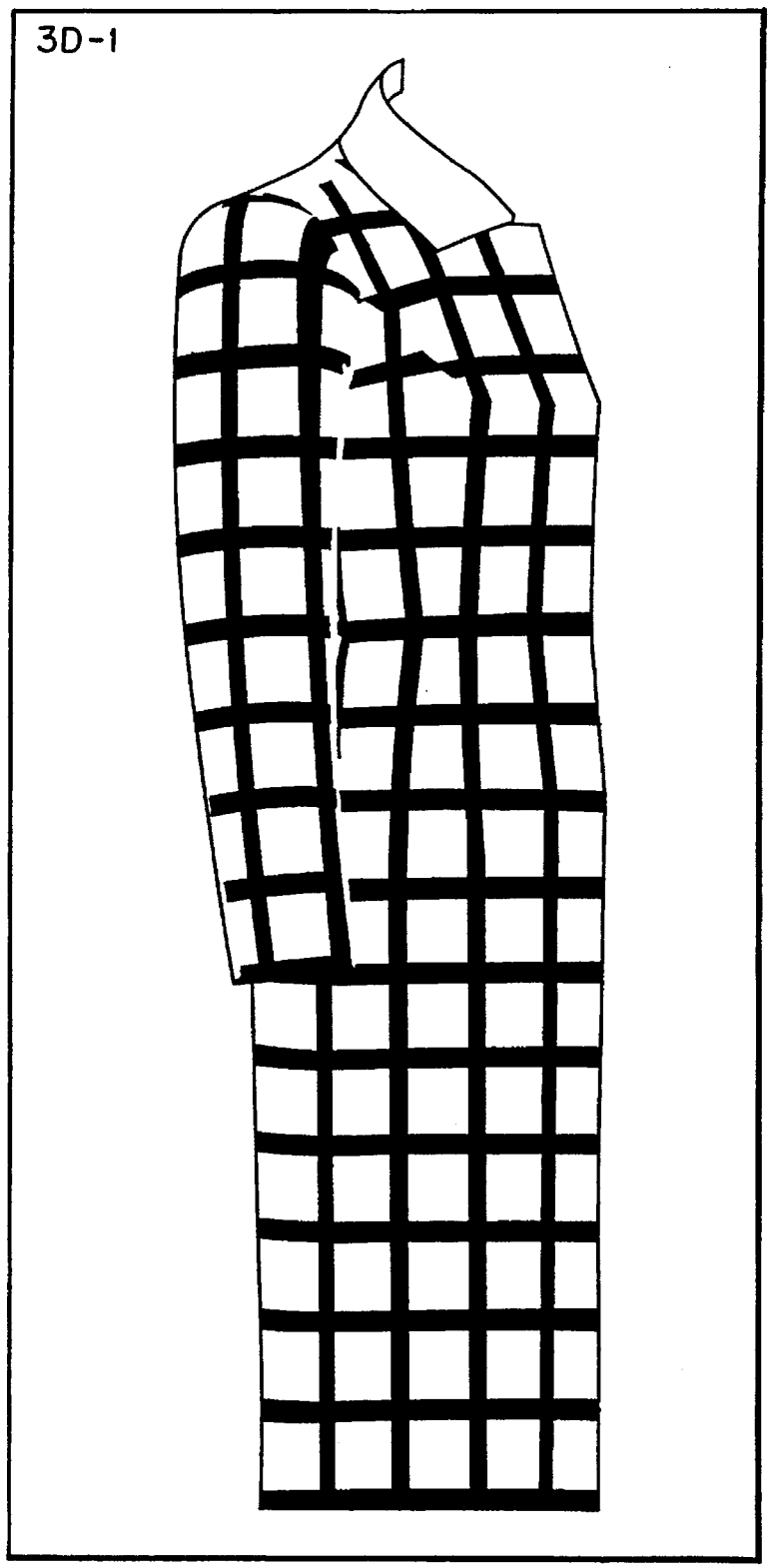
FIG. 27 is a display example of a two-dimensional projection image showing an assembled condition of a cloth having a color pattern thereon.

FIGS. 26 and 27 show images of the cloth pattern mapping, and illustrate an example of an arrangement of the sewing patterns in which the cloth patterns are placed so as to fit to each other when the sewing patterns are assembled. In this state, the positions of cross points of given pattern repetition lines within the sewing patterns are determined, and marks C are attached to the sewing patterns to the cross points. Thus, it becomes possible to relocate the sewing patterns on a long-sized cloth in such a manner that the yield will be improved in the condition that the marks C agree with the cross points of the repetition lines. In FIG. 6, a yield of 64.1% was obtained by using a cloth of 75.5 cm wide by 162.0 cm long.

Figure 28:
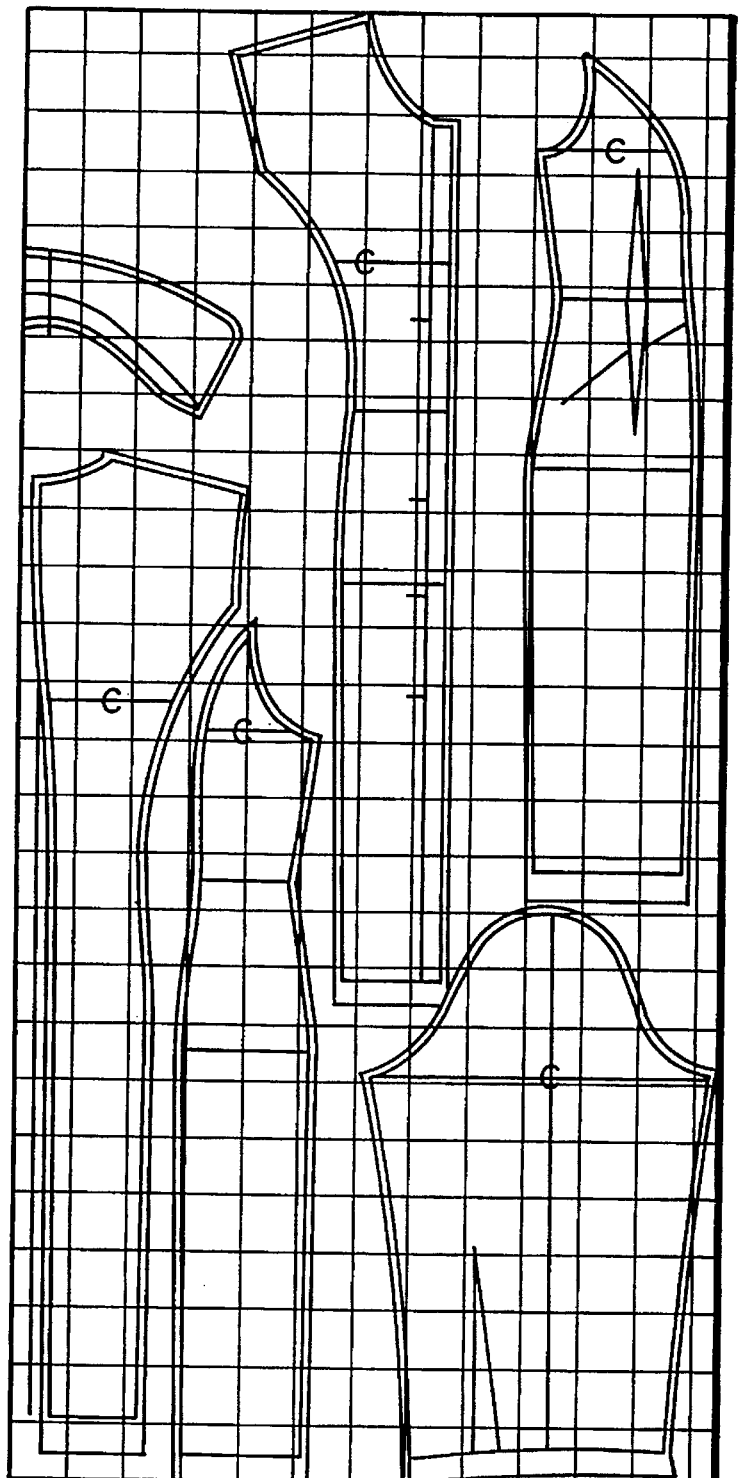
FIG. 28 is a schematic plan view showing sewing patterns placed on a cloth.
Figure 29:
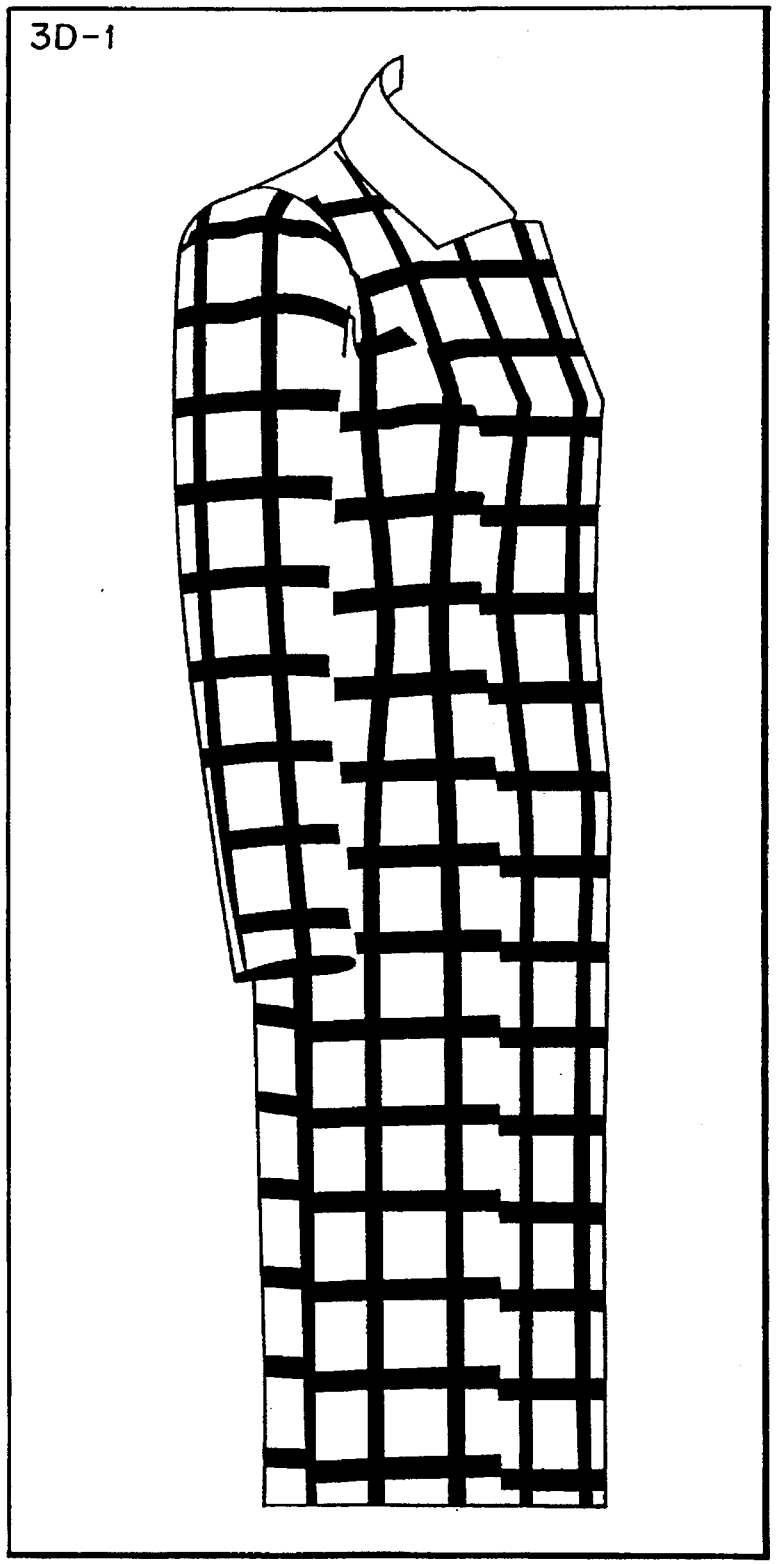
FIG. 29 is a display example of a two-dimensional projection image showing an assembled condition of cloths having a pattern thereon.

FIGS. 28 and 29 show an example in which the cloth patterns do not fit to the design because of the precedence of the yield.

With this embodiment, by adjusting the arrangement of the sewing patterns while observing the cloth pattern mapping display of the projection image, it becomes possible to check the adaptability of the cloth pattern to the assembled shape, and to determine the final arrangement of the sewing patterns. In determining the adaptability of the cloth pattern to the assembled shape, although the allowance depends on the design and product quality, the operator can carry out the design work while checking both the cost calculated from the cloth length and the continuity of the cloth pattern of the product.

Therefore, the cloth cost can be estimated from the cloth area including the arrangement of the sewing patterns. In addition, design of cloth (determination of cloth width and cloth pattern size) can be accomplished by carrying out simulation by changing the repetition width and length of the cloth pattern. Furthermore, the fitness of the design (the forms of the sewing patterns) and cloth pattern can be checked.

Next, the input operation by the user and the input information conversion in displaying the two-dimensional projection image will now be described in detail.

This embodiment is characterized in that the position of the three-dimensional viewpoint, the position of the reference point of the eyes, and the position of the light source are inputted from the coordinate input unit 80 in the form of coordinates on the two-dimensional space, and that these positions can be visually checked on the display screen of the display unit 40. Here, the positions of the viewpoint and the reference point are necessary for displaying the three-dimensional image, and the light source is needed for displaying the shading.

Figure 30:
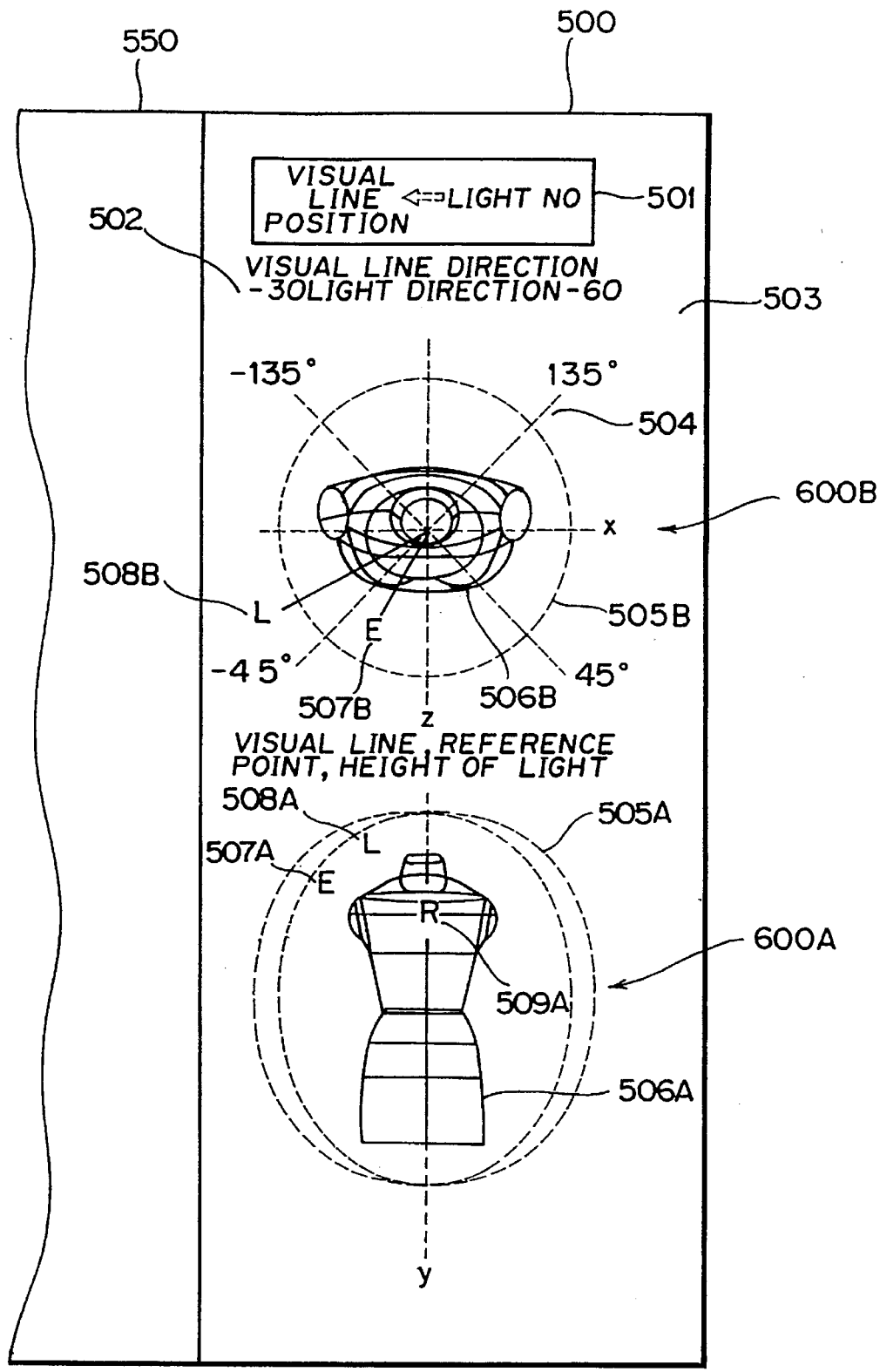
FIG. 30 is a schematic diagram showing a display form in a viewpoint position input mode in the embodiment according to the present invention.

FIG. 30 shows an example of the display for this purpose.

In FIG. 30, reference numeral 550 designates a window area for displaying a three-dimensional image after the position of the viewpoint is entered. Reference numeral 500 designates a window area for displaying the positions shown by the position information and other information associated with the input processing. Reference numeral 501 designates a select menu for the user to input an instruction as to whether or not the sight line position agrees with the light source position.

Reference numeral 502 designates message information and numerical information indicating the direction of the sight line with regard to the currently set viewpoint. Reference numeral 503 designates message information and numerical information indicating the direction of light projection of the currently set light source position.

Reference numeral 504 designates a reference line and its angle relative to the z axis, the reference line being used for learning the approximate directions of the sight line and the projection light of the light source. In this embodiment, under the condition that the viewpoint and light source move on the outer surface of a predetermined sphere with a radius ra1 (a fixed value determined from the size of assembled sewing pattern shape), the positions of the viewpoint and light source on the outer surface are inputted by the method which will be described later. For this purpose, a circle (a specific figure showing the two-dimensional space of the present invention) 505B is drawn to take account of the size of the display screen in displaying the sphere and inputting the viewpoint and the like.

Furthermore, an object for two-dimensional projection display, that is, a cross sectional shape 506B of the assembled sewing patterns on the x-z plane is drawn as a reference for inputting the sight line and projection light input. Symbol t is a reduction factor of the circle 505B and the cross sectional shape 506B to the actual shape. A straight line connecting a reference point R (described later) on the center (y axis) and the viewpoint indicated by symbol E (reference number 507B) represents the direction of the sight line relative to the z axis.

A straight line connecting symbol L (reference number 508B) and the central axis shows the direction of the light from the light source relative to the z axis. Such patterns displayed with respect to the x-z plane are referred to as menu B (reference number 600B) as a whole.

Reference numeral 505A designates the above-mentioned sphere which shows the two-dimensional space of the present invention. Reference numeral 506A designates a cross sectional shape of the assembled sewing pattern shape on the y-x plane. Symbol E (reference number 507A) designates the position of the viewpoint on the outer surface of the second sphere. The radius of the second sphere is also relatively indicated by the visual position. Symbol L (a specific mark showing the position of the viewpoint) designates the position of the light source on the outer surface of the sphere. Symbol R (reference number 509A) designates a reference point towards which the sight line and light are directed. Such patterns displayed with respect to the y-x plane as a whole are referred to a menu A (reference number 600A).

The user specifies the direction, position and the like of the viewpoint and light source by moving the symbols E and L on the menus A and B using the coordinate input unit 80. The CPU 10 as the calculation means of the present invention converts the input information from the coordinate input unit 80 to three-dimensional coordinate values indicating the positions of the viewpoint and light source.

The calculation procedure will now be described.

Figure 31:
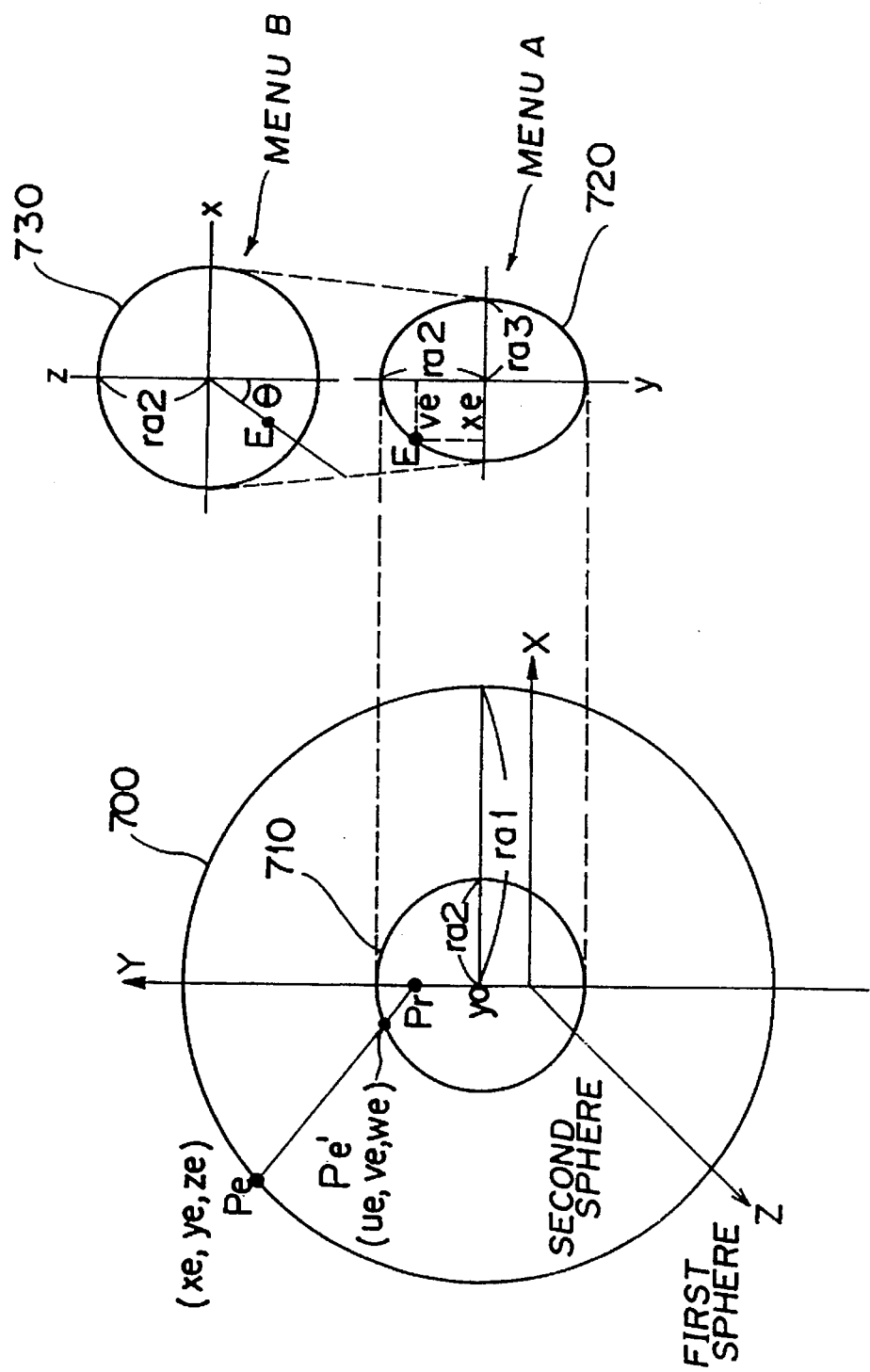
FIG. 31 is a schematic diagram showing the relationship between viewpoint positions on a three-dimensional space and a two-dimensional space.

FIG. 31 shows the correlation between the viewpoint position to be calculated and the viewpoint position drawn on the display screen.

A circle 700 indicates a sphere (hereinafter referred to as a first sphere) including the actual viewpoint on its outer surface. A circle 710 indicates a sphere (hereinafter referred to as a second sphere) corresponding to a circle or ellipse to be displayed on the two-dimensional spaces 720 and 730.

The first sphere has a radius ra1, and the second sphere has a radius ra2, both having the same center. The center is placed at coordinates (0, y0, 0) on the three-dimensional coordinate axes, where y0 is a predetermined fixed value.

The viewpoint is represented by the point Pe, and its coordinate position by (xe, ye, ze). The reference point is represented by the point Pr. Since the reference point is on the y axis, its coordinate point is represented by (0, yr, 0).

The coordinate of the point Pe' at which a line connecting the actual viewpoint and the reference point intersects the outer surface of the second sphere is represented by (ue, ve, we).

When the vector from the point Pe' towards the point Pr (written as the vector Pe'-Pr) is projected on the x-z plane, a vector from the symbol E (reference number 507B) towards the center is obtained on the two-dimensional space 730 and the menu B in FIG. 30. Furthermore, when the point Pe' is projected on the y-x plane, the position of the symbol E (reference number 507A) is obtained on the two-dimensional space 720 and the menu A in FIG. 30.

This correlation is represented by formulas as follows:

$$ue = t \times xe \tag{3}$$

$$ve = yr + t \times (ye - yr) \tag{4}$$

$$we = t \times ze \tag{5}$$

$$\tan(\text{viewpoint}) = xe/ze \tag{6}$$

$$(ue)^2 + (ve - yo)^2 + (we)^2 = (ra2)^2 \tag{7}$$

$$(xe)^2 + (ye - yo)^2 + (ze)^2 = (ra1)^2 \tag{8}$$

where, t is a parameter determining the position on the vector.

In this embodiment, the actual three-dimensional coordinate values are calculated from the positions of the above respective symbols using the corresponding relations of the above equations and those of the display positions of the symbols E, R, and L, which are obtained by two-dimensionally projecting the positions on the second sphere.

The operation of the user, and the display processing on the display screen will be described with reference to the flow charts in FIGS. 32A–37. FIGS. 32A–37 show the control procedures executed by the CPU 10 in the viewpoint coordinate input mode.

Figure 32A:
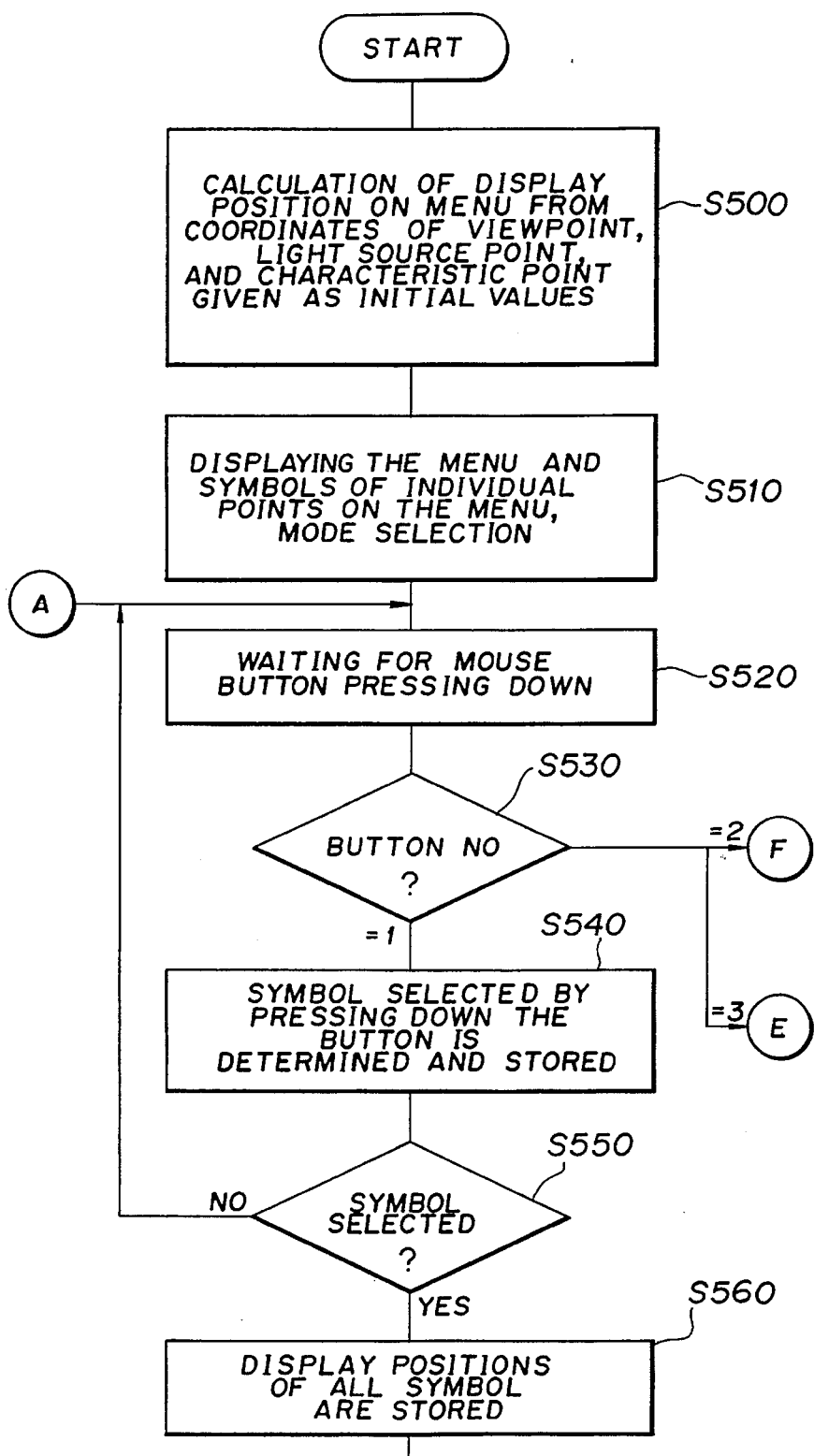
FIGS. 32A and 32B are flow charts showing control procedures executed by the CPU 10 in FIG. 3.
Figure 32B:
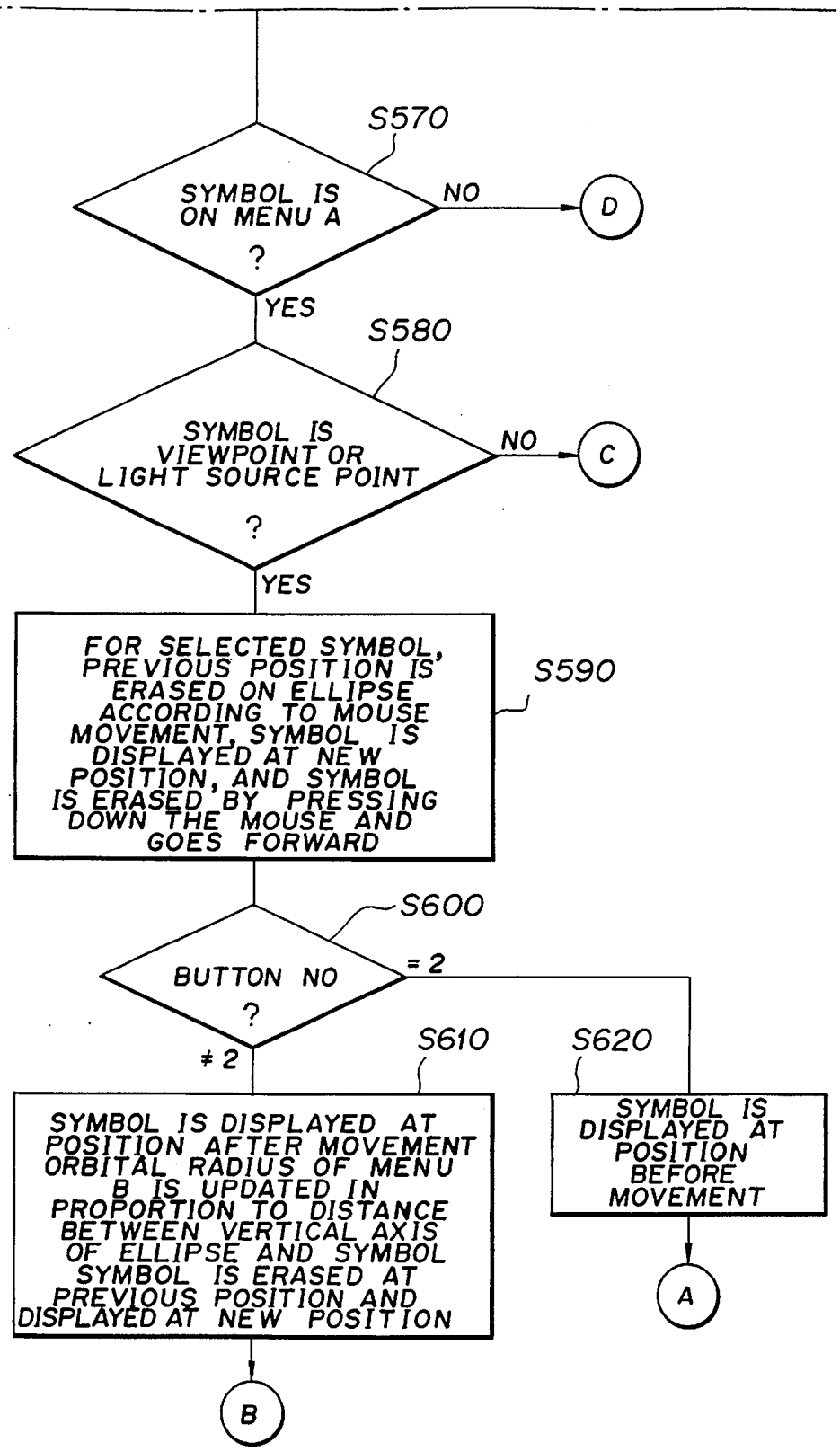

In FIGS. 32A and 32B, the CPU 10 computes the radius ra1 of the first sphere, the radius ra2 of the second sphere, and the coordinate values of the viewpoint, light source, and reference point, which are given as initial values, from the sizes of the shape of the assembled sewing patterns and the size of the display screen, by using predetermined equations or table search.

Then, after determining, by using equations (3)–(7), the parameter t, the positions of the points on the outer surface of the second sphere, the direction of the sight line, and the display positions and shapes of circles and ellipses for menus A and B, the menus A and B are displayed as shown in FIG. 30 (steps S500–S510 in FIG. 32A).

In this case, the user instructs by using the coordinate input unit 80 the information on whether the viewpoint position is made agreement with the light source position. The CPU 10 temporarily stores the input information on the RAM 30, and waits for an input from the coordinate input unit (mouse) (step S520 in FIG. 32A). By using the coordinate input unit 80, one of the following modes is specified by different click buttons.

(1) Position change mode of the viewpoint, light source point, and reference point.

(2) Finally determined position input mode.

(3) Termination mode (cancel mode) of this procedure.

The user first moves the cursor on the symbol E (FIG. 30) indicating the viewpoint on the menu A screen by operating the coordinate input unit 80, and instructs the position change mode to the CPU 10.

In response to the instruction, the CPU 10 identifies the type of the selected symbol (viewpoint) from the cursor position, and then temporarily stores the display positions of all symbols on the display screen in the work area of the RAM 30 (step S560 in FIG. 32A). A case where the user selects the viewpoint symbol E will be described as an example.

The user operates the coordinate input unit 80 to move the cursor to a desired position in the menu A on the display screen. The CPU 10 moves the symbol E on the cursor instructed by the coordinate input unit 80. When it is indicated that the viewpoint position agrees with the light source position, the execution procedure of the CPU 10 passes through steps S570–S580–S590–S600, and the movement is carried out on the display screen at step S590.

In this case, when the cancel mode is instructed from the coordinate input unit 80, the CPU 10 returns the position of the symbol displayed to its original position, and the execution procedure is returned to step S520. Thus, the user can perform the mode selection again.

On the other hand, when the cancel mode is not instructed, the display position of the symbol E after movement is replaced with the coordinate system in FIG. 30, and the radius of the circle (reference number 505B in FIG. 30, reference number 730 in FIG. 31) on the display screen is determined from the replaced coordinate system. More specifically, the radius of the circle is updated in proportion to the distance between the symbol position after movement and the vertical axis (z axis) of the ellipse. Furthermore, according to the update, the orbital circle 505B in the menu B is also updated (step S610 in FIG. 32B).

Figure 33:
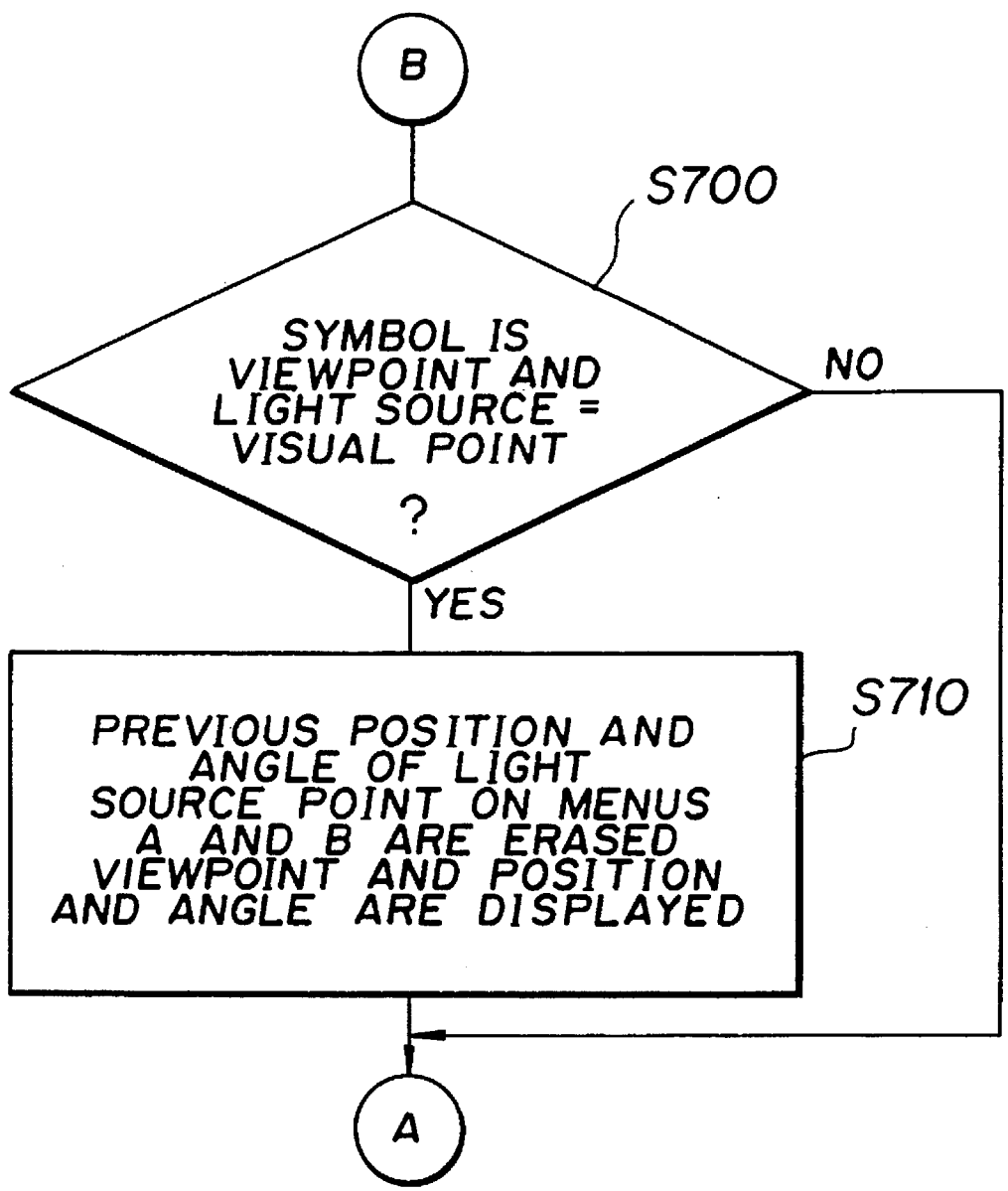
FIGS. 33–37 are flow charts showing control procedures executed by the CPU 10 in FIG. 3.

After that, the CPU 10 changes the numerical display concerning the direction of the sight line and the sight line angle to the updated values (from step S610 in FIG. 32B to steps S700 and S710 in FIG. 33). Then, the execution procedure returns to the processing at step S520.

Figure 34:
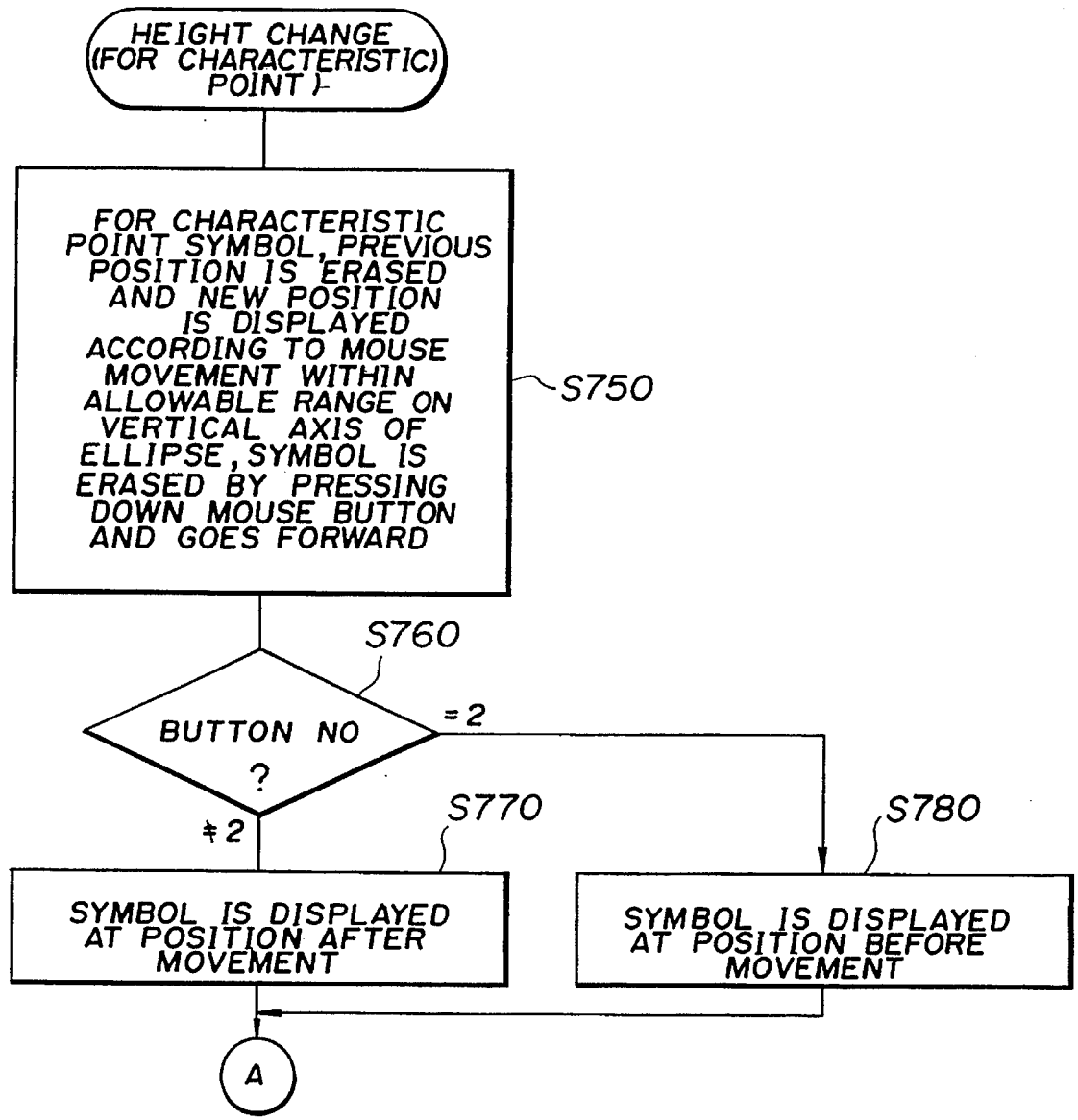

On the other hand, as shown in FIG. 30, when it is instructed in advance that the light source position is not made in agreement with the viewpoint position, the execution procedure of the CPU 10 proceeds from step S580 in FIG. 32B to step S750 in FIG. 34 where the CPU 10 calculates the moving position of the symbol which is instructed to move, and updates the display position of the symbol on the menu A (from steps S760 and S770 in FIG. 34 to step S520 in FIG. 32). Canceling processing by click operation is possible again in this case.

Thus, after the height of the viewpoint position is varied, the user operates the click of the coordinate input unit 80 to move the cursor onto the menu B if necessary, thereby changing the symbol position. When the CPU 10 detects that the cursor reaches the menu B (step S570 in FIG. 32B), the execution procedure proceeds to the sight line angle change processing.

Figure 35:
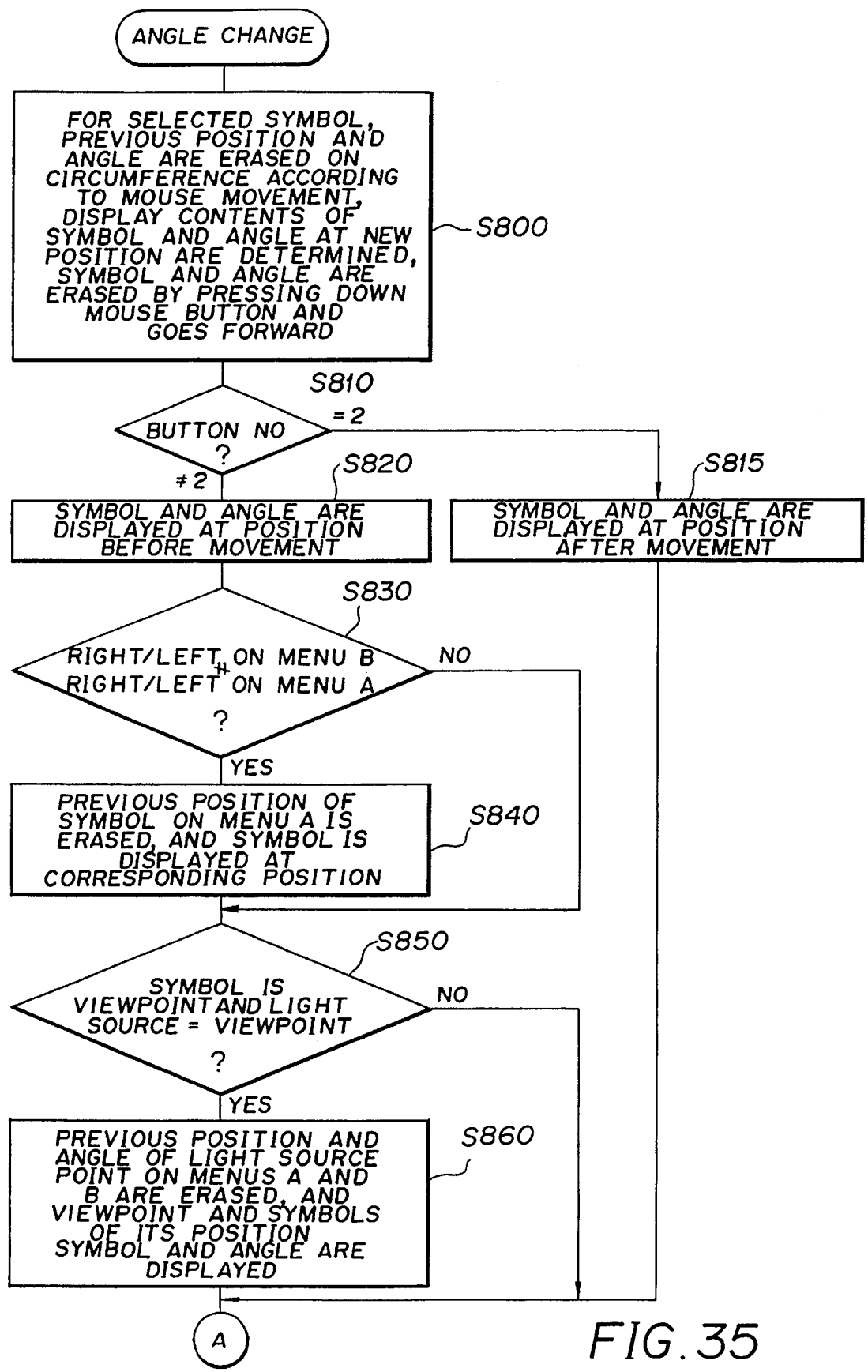

In FIG. 35, the CPU 10 changes the information associated with the coordinate positions on the second sphere on the basis of the proportional relationship between the symbol positions before and after the movement, and updates the displayed numerical information about the symbol display, position, and angle (steps S800, S810, and S820 in FIG. 35).

According to the movement, the height of the viewpoint on the second sphere moves on the outer surface with maintaining the height unchanged. Thus, the display position of the viewpoint on the menu A is changed according to the movement of the position. In this angle processing, when the movement of the light source position (including the case where the light source position agrees with the viewpoint position) is instructed by the user, the symbol is also moved as in the above case (steps S850 and S860 in FIG. 35).

As described above, according to the movement instruction from the coordinate input unit 80, the CPU 10 changes the display positions of the viewpoint, light source, and reference point, and changes the coordinate positions of these points on the second sphere, which are stored on the RAM 30. After that, the user instructs the final position input mode by clicking the coordinate input unit 80.

Figure 36:
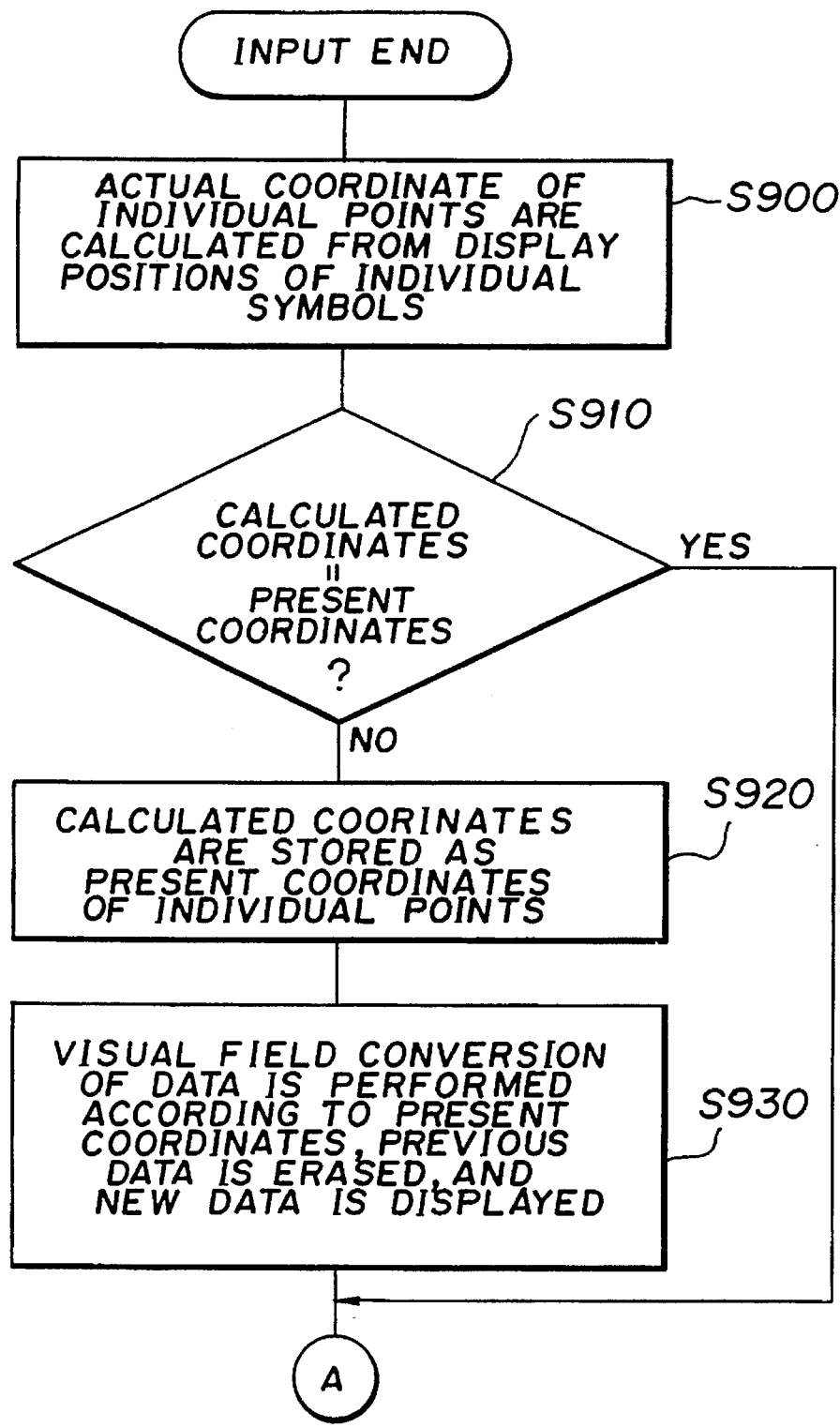
Figure 37:
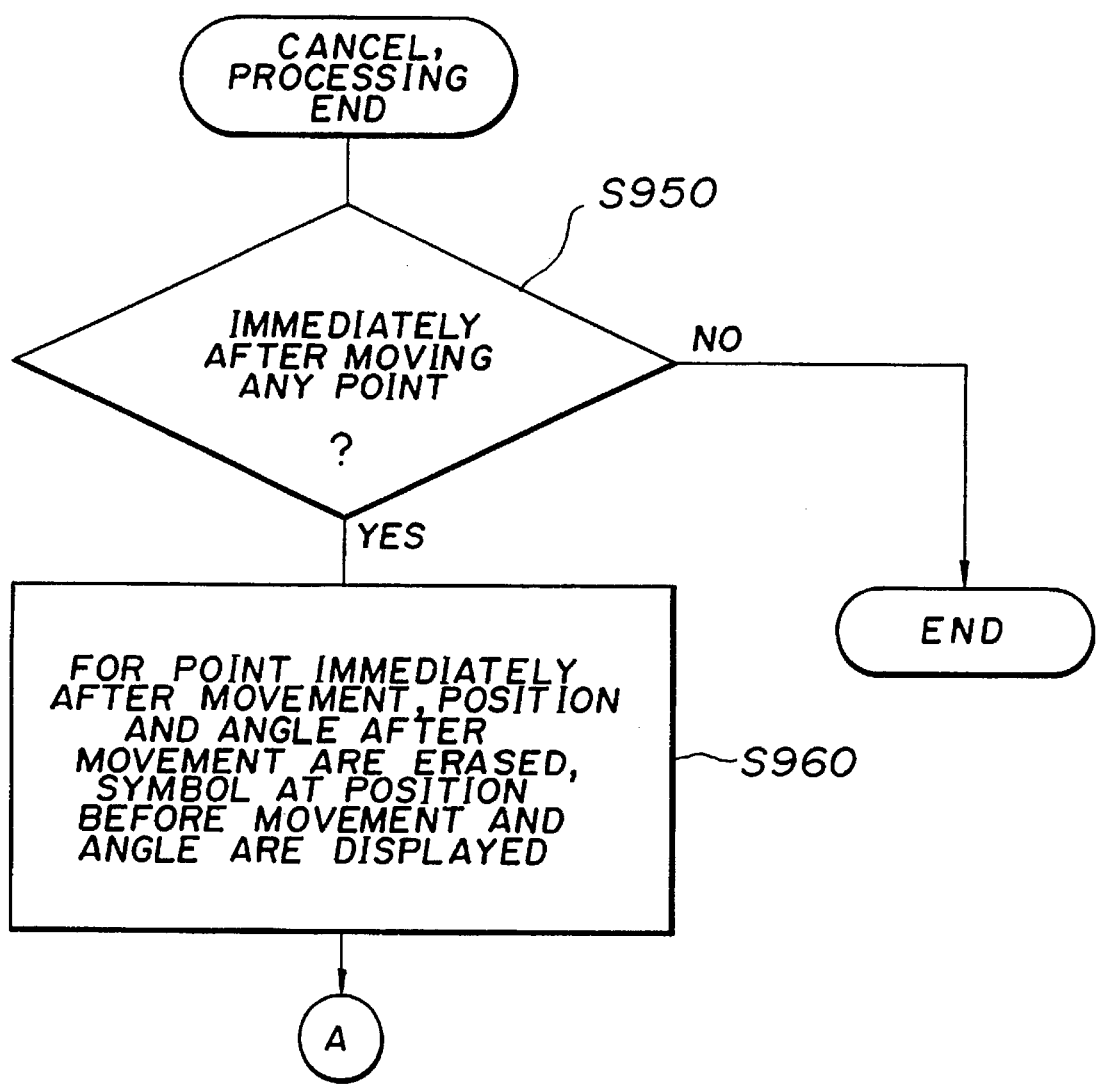

When the instruction is detected at step S530 in FIG. 32A, the execution procedure of the CPU 10 proceeds to step S900 in FIG. 36, where the CPU 10 calculates the display positions of the actual three-dimensional coordinates (xe, ye, ze) from the displayed positions (coordinate positions on the second sphere) of the currently set individual points by using equations (3)–(5) and (8).

After that, when there is a change in the viewpoint or the like, the CPU 10 updates the coordinate values of the changed point in the coordinate values of respective points stored on the RAM 30 (steps S910 and S920 in FIG. 36). When the viewpoint or the reference point is changed, the CPU 10 generates a two-dimensionally projected image of the three-dimensional shape formed by the shape data of the assembled sewing patterns. It is needless to say that when the light source position is changed, the shading of the two-dimensional image is also changed. Subsequently, the CPU 10 displays a two-dimensional projection image as shown in FIG. 17 in a window area 550 in FIG. 30 according to the shape data of the changed shape of the assembled sewing patterns.

After that, the operator observes the image display on the window area 550 and, if necessary, performs position changes of the viewpoint and the like using the menus A and B on the window area 500. Thus, by comparing the perspectively viewed two-dimensional projection image with the symbol positions on the menus A and B, the user can easily learn the corrected positions of the viewpoint and the like.

To terminate the control procedure shown in FIGS. 32A–37, the user instructs the cancel/termination mode by the coordinate input unit 80. The instruction is detected by the CPU 10 at step S530 in FIG. 32A. After identifying the termination at step S950 in FIG. 37, the CPU 10 completes the control procedure.

Next, the procedure will be described wherein new design lines are generated on the image associated with the shape data of the sewing patterns, and the design lines are displayed on another image. Here, the new design lines are generated on the basis of the two-dimensional projection image and the shape data of the sewing patterns, which show the shape formed by assembling the thus obtained sewing patterns.

The mesh vertices correspond to the points on each sewing pattern and the points on the corrected dummy. Assuming that the sewing pattern data is P (Px, Py), the mesh data of the corresponding corrected dummy is R (Rx, Ry, Rz), and the points of the two-dimensional projection image corresponding to the mesh data R of the corrected dummy are Q (Qx, Qy), the individual coordinates are represented by the following formulas:

$$Q(Qx, Qy) = f_1(R, \text{viewpoint coordinate values, reference point coordinate values}) \quad (9)$$

The coordinates of the vertices of the quadrangle of meshes of the sewing patterns are referred to as $P_1$, $P_2$, $P_3$ and $P_4$ in the counterclockwise, and the coordinates of the vertices of the corresponding corrected dummy are referred to as $R_1$, $R_2$, $R_3$ and $R_4$. The corrected dummy quadrangle is converted to the quadrangle $Q_1$, $Q_2$, $Q_3$ and $Q_4$ of the two-dimensional projection image according to the relation represented by equation (9). Here, parameter u and v that express the position the point P within the quadrangle $P_1$, $P_2$, $P_3$, and $P_4$ can be expressed by the following equation.

$$(u, v) = f_2(P, P_1, P_2, P_3, P_4) \quad (10)$$

The point R corresponding to the point P is represented as $$R = (R_1 \times (1-v) + R_4 \times v)(1-u) + (R_1 \times (1-v) + R_3 \times v)u \quad (11)$$

Similarly, parameter u and v that express the position of the point Q within the quadrangle $Q_1$, $Q_2$, $Q_3$ and $Q_4$ is expressed by the following equation.

$$(u, v) = f_2(Q, Q_1, Q_2, Q_3, Q_4) \quad (12)$$

The point P corresponding to the point Q is represented as $$P = (P_1 \times (1-v) + P_4 \times v)(1-u) + (P_1 \times (1-v) + P_3 \times v)u \quad (13)$$

Where the function $f_1$ corresponds to viewing transformation, and $f_2$ is an equation with regard to u and v.

On the basis of the relationships among the two-dimensional coordinate data of the sewing patterns, the mesh data (three-dimensional coordinate data) of the corrected dummy, and the two-dimensional projection image data corresponding to the mesh data of the corrected dummy, the two-dimensional projection image of the assembled sewing patterns and the two-dimensional image of the sewing patterns are displayed on the same screen by CPV10 (display control means). Furthermore, design lines of the two-dimensional images of the sewing patterns can be generated and deleted by forming and deleting the design lines such as seam lines, internal lines, and the like on the two-dimensional projection image. Conversely, the design lines of the two-dimensional projection image can be formed and deleted by forming and deleting the design lines such as seam lines, internal lines and the like on the two-dimensional images of the sewing patterns.

Figure 38:
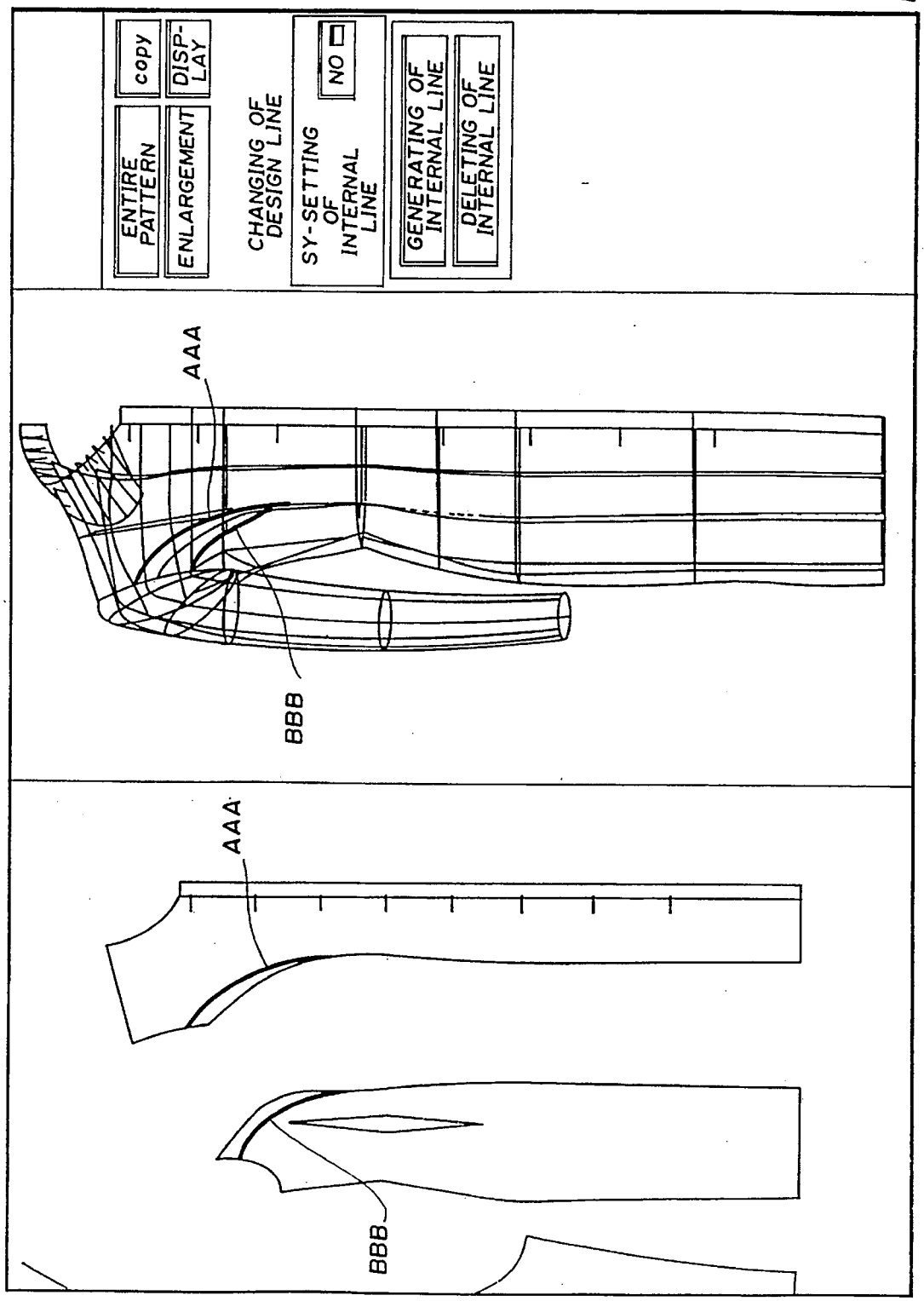
FIG. 38 is a schematic diagram showing a display form in the embodiment according to the present invention.

FIG. 38 is a schematic diagram illustrating the menu displayed at the right-hand side of the display screen when the change in the design lines is selected, and the two-dimensional projection image and the images of the sewing patterns displayed in parallel at the center and the left-hand sides, respectively.

When the operator selects the "internal line generation" button in the menu area, and continuously inputs the coordinate points on the two-dimensional projection image through the coordinate input unit 80, the design lines are drawn on the two-dimensional projection image and the images of the sewing patterns (symbol AAA in FIG. 38).

Similarly, by continuously inputting the coordinate points on the images of the sewing patterns through the coordinate input unit 80, the design lines are drawn on the two-dimensional projection image and the images of the sewing patterns (symbol BBB in FIG. 38).

Figure 39:
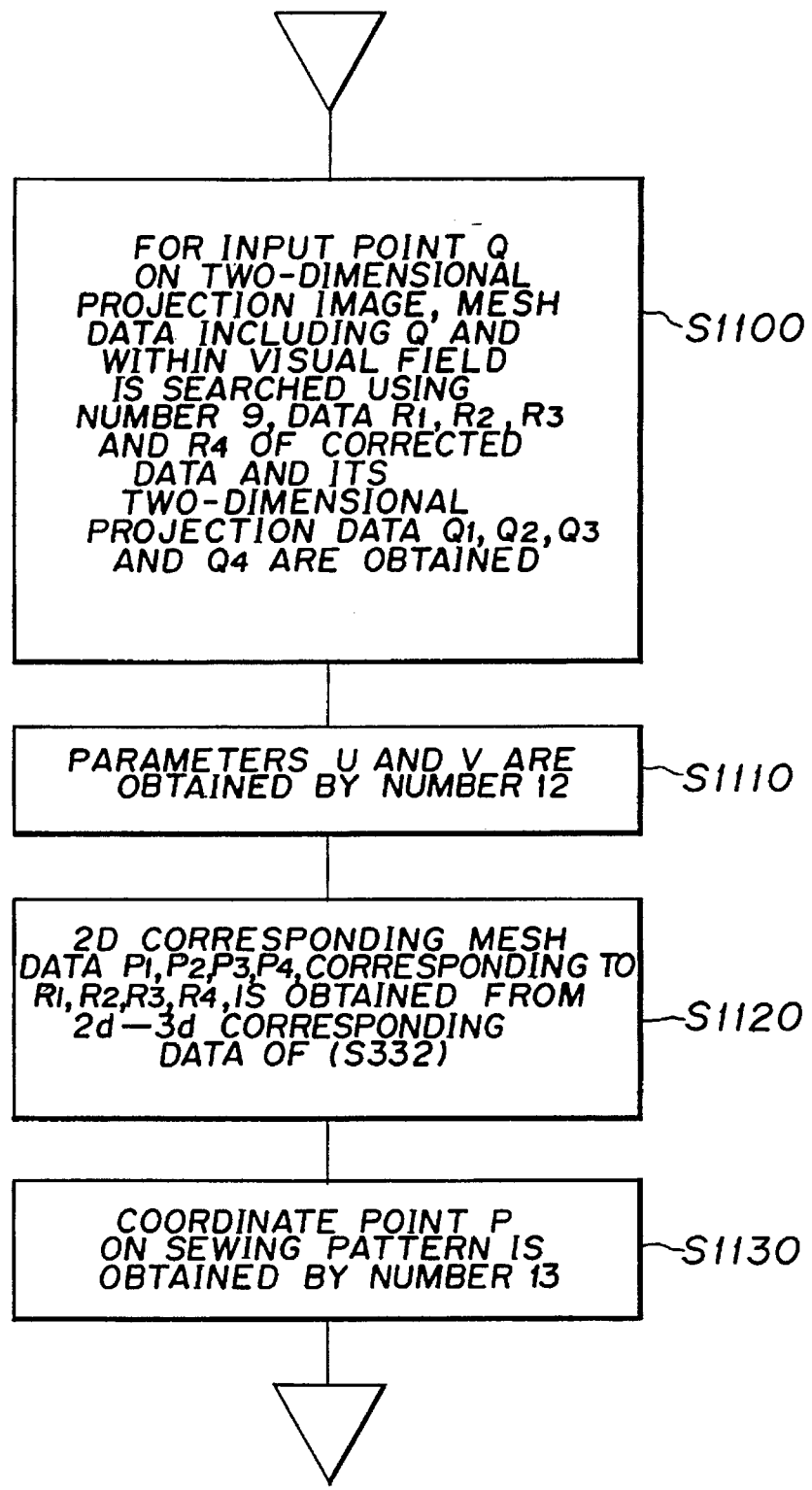
FIGS. 39 and 40 are flow charts showing control procedures executed by the CPU 10 in FIG. 3.
Figure 40:
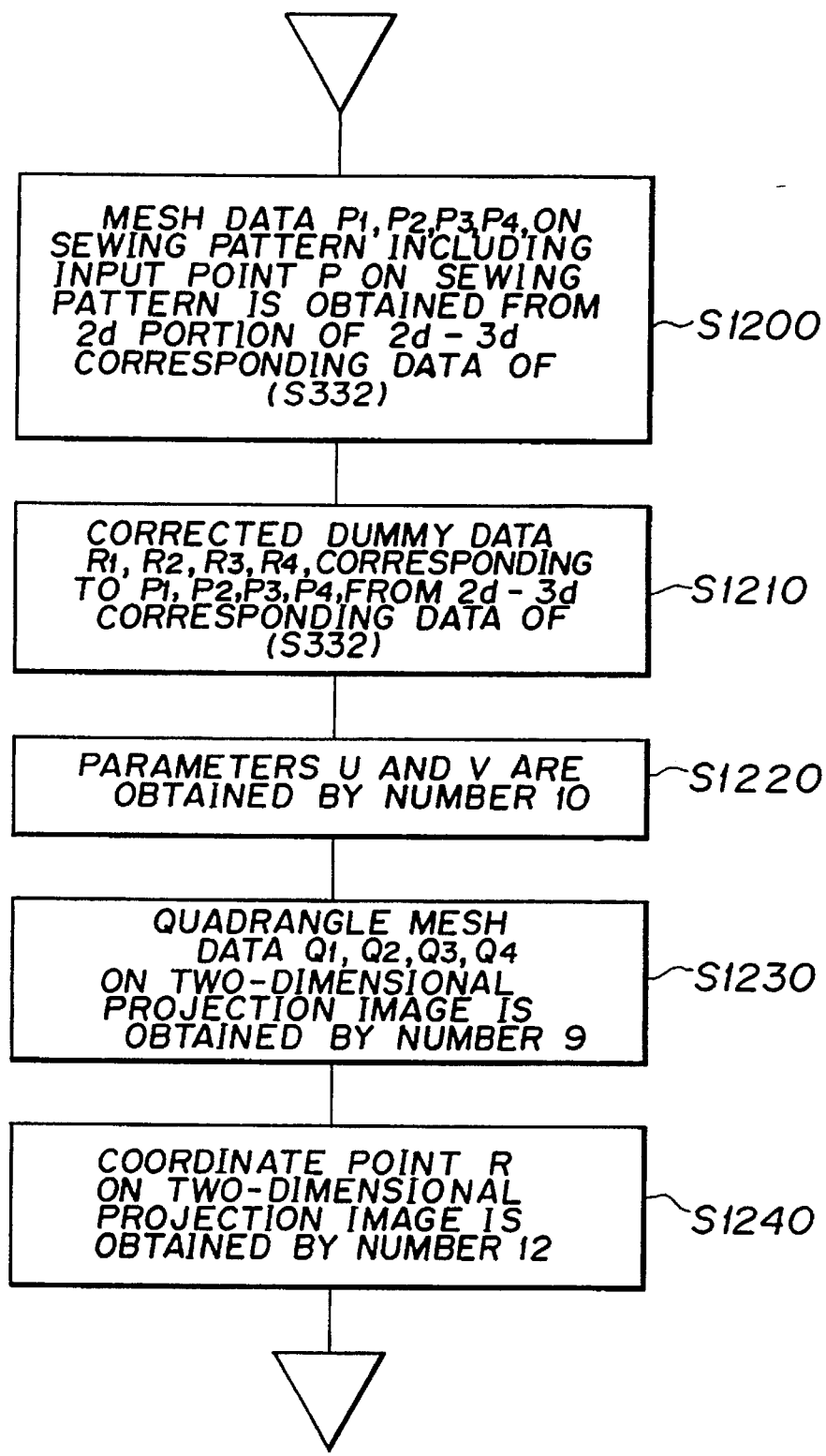

The flows of such calculation processing are shown in FIGS. 39 and 40. FIG. 39 shows a processing to obtain the coordinate points of the sewing patterns corresponding to the input points Q on the two-dimensional projection image, and FIG. 40 shows a processing to obtain the coordinate points Q on the two-dimensional projection image corresponding to the points P on the coordinates of the sewing patterns.

In FIG. 39, for the input points Q on the two-dimensional projection image, the mesh data within the visual field and including Q is searched using equation (9), and the data $R_1$, $R_2$, $R_3$ and $R_4$ of the corrected dummy and the data $Q_1$, $Q_2$, $Q_3$ and $Q_4$ of its two-dimensional projection image are calculated (step S1100). In addition, the parameters u and v are calculated by equation (12). And then, the two-dimensional projection image data $P_1$, $P_2$, $P_3$ and $P_4$ corresponding to $R_1$, $R_2$, $R_3$ and $R_4$ are calculated from the coordinates of the two-dimensional sewing patterns and the data corresponding to the three-dimensional coordinates (step S1120). Furthermore, the coordinates on the sewing patterns are calculated by equation (13) to obtain the coordinate points P of the sewing patterns.

In FIG. 40, the reverse calculation is made, in which the mesh data $P_1$, $P_2$, $P_3$ and $P_4$ including the input points P on the images of the sewing pattern is searched from the corresponding data of the two-dimensional coordinate and the three-dimensional coordinate (step S1200), and $R_1$, $R_2$, $R_3$ and $R_4$ are calculated from the corresponding data (step S1210). Then, the parameters u and v are calculated from equation (100, and the data $Q_1$, $Q_2$, $Q_3$ and $Q_4$ of the two-dimensional projection image can be calculated to obtain the coordinate point R by equation (12).

As described above, displaying the two-dimensional projection image and the sewing pattern image, and generating and deleting the design lines, the apparel design work can be efficiently carried out by comparing the design lines on the sewing pattern with those of the wearing condition and changing the design lines, without producing the actual dress.

In addition to this embodiment, it is possible to implement the following examples:

1) Although the desired shape data is selected from the data base of the reference dummy shape data registered on the floppy disk (FD) 100 in this embodiment, the shape data may be read directly from the FD 100 by specifying the identification code attached to the shape data.

2) Although the shape data on the sewing pattern is not stored as a data base in this embodiment, the shape data on various sewing patterns may be stored on the FD 100 and handled as a data base.

3) Although the assembled state of the entire sewing patterns is displayed in this embodiment, an enlarged portion thereof may be specified to be displayed instead.

4) Although merely the coordinate values (section data) of the characteristic points are inputted in order to reduce the input operation of the shape data of the reference dummy, and the mesh data is calculated by the interpolation method in this embodiment, the increasing number of section data will provide a better estimation of the actually assembled state.

5) A better estimation of the actually assembled state of the sewing patterns can be obtained by determining equations for calculating the three-dimensional coordinate values of the expanded reference dummy in accordance with the body style of the reference dummy and the material quality of the apparel. Furthermore, when the sewing patterns are short in length, the reference dummy is reduced.

6) Although the expansion factors are used as an intermediate parameter for calculating the assembled shape of the sewing patterns in this embodiment, the three-dimensional coordinate values showing the assembled shape are calculated directly from the entire circumference value of each section of the shape of the assembled sewing patterns. This is substantially the same in function as this embodiment.

Figure 41:
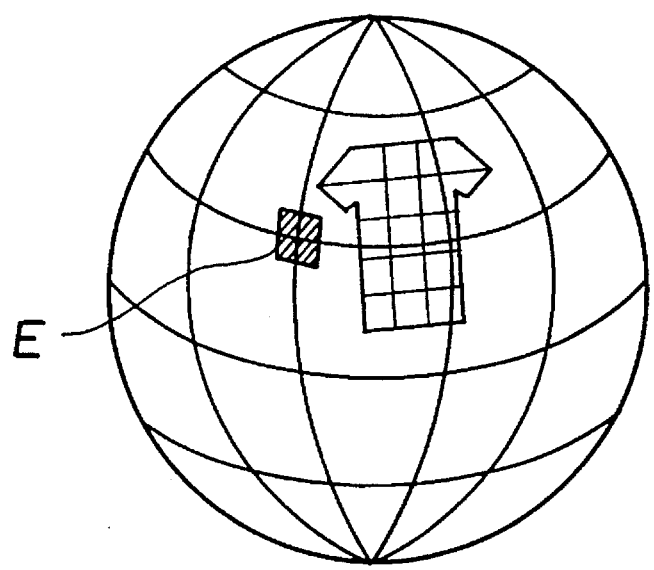
FIG. 41 is a schematic diagram showing another display form associated with coordinate input.
Figure 42:
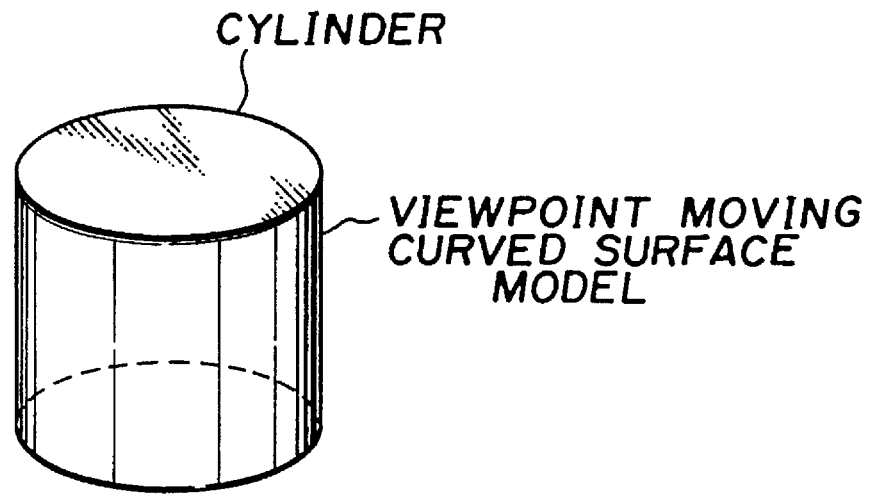
FIG. 42 is a schematic diagram showing another display form associated with coordinate input.
Figure 42:
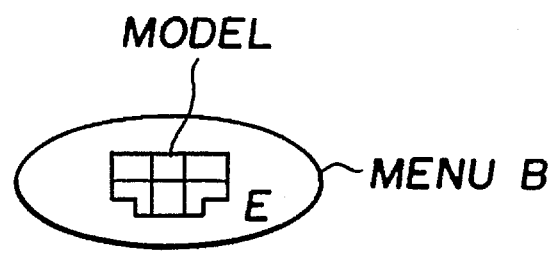
Figure 42:
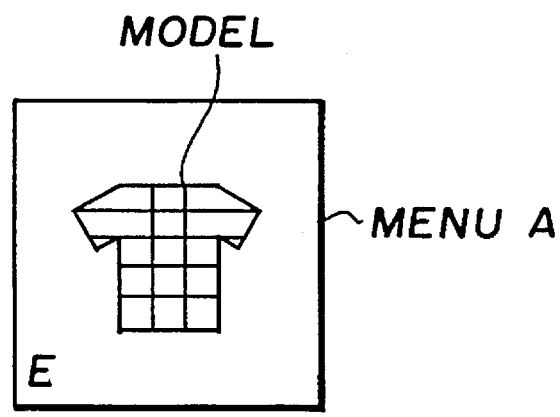

7) Although this embodiment uses two types of two-dimensional planes of menus A and B as shown in FIG. 30 in order to clearly show the positional relationships between the assembled image of the sewing patterns and the viewpoint and the like, using a two-dimensional perspective image of a sphere as shown in FIG. 41 makes it possible to indicate the position by a single type of display menu. In this case, the two-dimensional coordinate positions of symbols on the display screen are converted to the three-dimensional coordinate values according to a predetermined correlation as in the above-described method. Furthermore, a cylindrically curved surface can be used for moving the viewpoint as shown in FIG. 42.

8) Although the two-dimensional coordinate positions of the symbols are calculated using equations in this embodiment, the coordinate positions may be converted by using a calculator comprising a ROM or the like. In this case, addresses corresponding to the respective positions of the displayed pixels of the menus A and B are established so that the three-dimensional coordinate values are stored in these addresses when the symbols are placed at the displayed pixel positions. When the display position of a symbol is actually inputted by the coordinate input unit 80, the three-dimensional coordinate values can be immediately obtained by inputting to the ROM the address obtained by converting the position of the symbol.

9) Although the parameters associated with the direction and height are displayed as numerical information on the mean to determine the coordinate values in this embodiment, the three-dimensional coordinate values (u, v, w) on the point on the second sphere can also be used.

10) Although the coordinate input of the three-dimensional image of this embodiment is explained in connection with an example of displaying the image of the assembled sewing patterns, a display other than three-dimensional images is possible.

11) When varying the distance of the viewpoint while maintaining the direction of the sight line, the radius ra2 used in equation (7) may be numerically inputted from the keyboard input unit 70 to calculate the radius ra1 from the radius ra2.

12) Although the sight line and the light source share a common reference point in this embodiment, they may have different reference points.

13) Although the perspective image of FIG. 17 and the input menu screen of FIG. 30 are displayed in juxtaposition with each other in this embodiment, the screen mode may be switched to sequentially display an enlarged image of these images.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A shape visualization method comprising the steps of:

generating three-dimensional coordinate values indicating a shape formed by assembling sewing patterns;

generating by an image processing unit a two-dimensional projection image from the generated three-dimensional coordinate values; and displaying the generated two-dimensional projection image as a two-dimensional projection image of the shape formed by assembling said sewing patterns on a display screen of a display unit, wherein the step of generating three-dimensional coordinate values comprises substeps of:

inputting said three-dimensional coordinate values corresponding to a plurality of points on circumferences of a plurality of cross sections, having a curvature, that are located on specific height of a shape of a dress form as a reference;

calculating entire circumferential lengths of cross sections of the dress form, which are drawn from the inputted three-dimensional coordinate values and entire circumferential lengths of cross sections of a shape that should be formed by assembling sewing patterns on said dress form which are drawn from the inputted two-dimensional shape data;

calculating respectively expansion factors of cross sections, which are drawn from said entire circumferential lengths of the cross sections of the dress form and said entire circumferential lengths of the cross sections of the shape that should be formed by assembling said sewing patterns on said dress form; and generating said new three-dimensional coordinate values indicating said shape formed by assembling the sewing patterns by expanding respectively the entire circumferences of the cross sections of the dress form indicated by said inputted three-dimensional coordinate values using predetermined functions and said expansion factors, said functions having different formulas for the cross sections, until a plurality of said entire circumferential lengths of the cross sections of the dress form coincide with certain limiting ones of said entire circumferential lengths of the cross sections of the shape that should be formed by assembling said sewing patterns on said dress form, leaving spaces with respect to other ones of said entire circumferential lengths of said shape that should be formed.

2. The shape visualization method as claimed in claim 1, wherein the step of generating by said image processing unit comprises the substeps of:

determining in advance respective correlations between a first coordinate position indicating a viewpoint in a three-dimensional space and second coordinate positions indicating viewpoints in two-dimensional spaces, said first coordinate position being used for generating the two-dimensional projection image, and said second coordinate positions being used for inputting an instruction;

displaying the two-dimensional spaces, which cross perpendicularly, and the viewpoints in the two-dimensional spaces as specific figures on the display screen;

inputting said second coordinate positions from a coordinate input unit;

converting said second coordinate positions inputted from the coordinate input unit into the first coordinate position of the viewpoint in the three-dimensional space according to said correlations; and generating by the image processing unit said two-dimensional projection image in accordance with the first coordinate position of the viewpoint obtained by converting said second coordinate positions.

3. The shape visualization method as claimed in claim 1, further comprising the steps of:

generating cross-sectional images of said dress form and of said shape formed by assembling the sewing patterns which represent portions of said shape; and displaying the generated cross-sectional images on the display screen of the display unit.

4. The shape-visualization method as claimed in claim 1, further comprising the steps of:

displaying on the display screen of said display unit the generated two-dimensional projection image as the two-dimensional image formed from the sewing patterns;

inputting coordinates of new design lines on the two-dimensional projection image from said coordinate input unit which represent changes to the sewing patterns;

forming the new design lines on the two-dimensional projection image formed from the sewing patterns in accordance with the inputted coordinates; and displaying the formed two-dimensional projection image including the formed design lines on the display screen.

5. The shape visualization method as claimed in claim 1, further comprising the steps of:

displaying on the display screen of said display unit the two-dimensional projection image as the two-dimensional image formed from the sewing patterns;

inputting from said coordinate input unit coordinates of new design lines, which represent changes to the sewing patterns, to be represented on the two-dimensional projection image formed from the sewing patterns;

forming said new design lines on the two-dimensional projection image in accordance with the inputted coordinates; and displaying the formed two-dimensional projection image including the formed design lines on the display screen.

6. A shape visualization apparatus comprising:

means for inputting two dimensional shape data of sewing patterns;

calculating means for generating three-dimensional coordinate values indicating a shape formed by assembling said sewing patterns;

image processing means for generating a two-dimensional projection image from the generated three-dimensional coordinate values; and display means for displaying the generated two-dimensional projection image as a two-dimensional projection image of the shape formed by assembling said sewing patterns, wherein said calculating means for generating new three-dimensional coordinate values comprises:

inputting means for inputting said three-dimensional coordinate values corresponding to a plurality of points on circumferences of a plurality of cross sections, having a curvature, that are located on specific heights of a shape of a dress form as a reference;

means for calculating entire circumferential lengths of cross sections of the dress form, which are drawn from the inputed three-dimensional coordinate values and entire circumferential lengths of cross sections of a shape that should be formed by assembling sewing patterns on said dress form, which are drawn from the inputted two-dimensional shape data;

means for calculating respectively expansion factors of cross sections which are drawn from said entire circumferential lengths of the cross sections of the dress form and said entire circumferential lengths of the cross sections of the shape that should be formed by assembling said sewing patterns on said dress form; and means for generating said new three-dimensional coordinate values indicating said shape formed by assembling the sewing patterns by expanding respectively the entire circumferences of the cross sections of the dress form indicated by said inputted three-dimensional coordinate values using predetermined functions and said expansion factors, said functions having different formulas for the cross sections, until a plurality of said entire circumferential lengths of the cross sections of the dress form coincide with certain, limiting ones of said entire circumferential lengths of the cross sections of the shape that should be formed by assembling said sewing patterns on said dress form, leaving spaces with respect to other ones of said entire circumferential lengths of said shape that should be formed.

7. The shape visualization apparatus as claimed in claim 6, further comprising coordinate input means for inputting a second coordinate position indicating the position of the viewpoint in a two-dimensional space, wherein said display means displays a two-dimensional space and the viewpoint as specific figures;

said calculation means determines in advance respective correlations between a first coordinate position indicating the position of a viewpoint in a three-dimensional space and second coordinate positions indicating viewpoints in two-dimensional spaces, said first coordinate position being used for generating the two-dimensional projection image, and said inputted second coordinate position being used for inputting instruction; said calculation means comprising means for converting said inputted second coordinate position into the first coordinate position of the viewpoint according to one of said respective correlations; and said image processing means generates said two-dimensional projection image in accordance with the first coordinate position of the viewpoint obtained by converting said inputted second coordinate position.

8. The shape visualization apparatus as claimed in claim 6, further comprising:

input means for inputting data regarding a cloth pattern;

coordinate input means for inputting positions of the sewing patterns on a cloth having the cloth pattern;

image processing means for mapping the cloth pattern on the two-dimensional projection image in accordance with the positions of the sewing patterns; and display control means for controlling the display of the formed two-dimensional projection image on the display screen of said display means.

9. The shape visualization apparatus as claimed in claim 6, further comprising:

display control means for controlling the display of the two-dimensional projection image as the two-dimensional image of the sewing patterns on the display screen of said display means; and coordinate input means for inputting coordinates of a new design line, representing a change to the sewing patterns, on the two-dimensional projection image, wherein said image processing means forms the new design line on the two-dimensional projection image of the sewing patterns based on the inputted coordinates, and said display control means controlling the display of the two-dimensional projection image of the sewing patterns on the display screen of said display means.

10. The shape visualization apparatus as claimed in claim 6, further comprising:

display control means for controlling the display of the two-dimensional projection image as the two-dimensional image of the sewing patterns on the display screen of said display means; and coordinate input means for inputting coordinates of a new design line, representing a change to the sewing patterns, on the two-dimensional projection image of the sewing patterns, wherein said image processing means forms the new design line on the two-dimensional projection image based on the inputted coordinates, and said display control means controls the display of the two-dimensional projection image on the display screen of said display means.

* * * * *